United States Patent
Chong, Jr.

(10) Patent No.: US 6,721,317 B2
(45) Date of Patent: Apr. 13, 2004

(54) SWITCH-BASED SCALABLE PERFORMANCE COMPUTER MEMORY ARCHITECTURE

(75) Inventor: Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/039,141

(22) Filed: Jan. 2, 2002

(65) Prior Publication Data

US 2002/0087751 A1 Jul. 4, 2002

Related U.S. Application Data

(60) Division of application No. 09/358,356, filed on Jul. 21, 1999, now Pat. No. 6,370,605, which is a continuation-in-part of application No. 09/262,407, filed on Mar. 4, 1999, now Pat. No. 6,349,357, and a continuation-in-part of application No. 09/261,978, filed on Mar. 4, 1999, now Pat. No. 6,397,267.

(51) Int. Cl.[7] .......................... H04L 12/28; H04L 12/56
(52) U.S. Cl. ..................... 370/389; 370/351; 370/355; 370/360; 370/365; 370/398; 370/395.31; 370/395.71; 370/412; 370/415; 710/38; 710/316
(58) Field of Search ................ 370/351–355, 370/360–365, 367, 363, 364, 389, 392, 398, 395.31–395.71, 412–415; 710/1, 30, 31, 36, 38–316

(56) References Cited

U.S. PATENT DOCUMENTS

| | | |
|---|---|---|
| 4,151,593 A | 4/1979 | Jenkins et al. |
| 4,434,487 A * | 2/1984 | Rubinson et al. ............ 714/710 |
| 4,603,416 A | 7/1986 | Servel et al. |
| 5,148,432 A | 9/1992 | Gordon et al. |
| 5,206,943 A | 4/1993 | Callison et al. |
| 5,448,709 A | 9/1995 | Chandler et al. |
| 5,487,160 A | 1/1996 | Bemis |
| 5,526,497 A | 6/1996 | Zilka et al. |
| 5,668,956 A | 9/1997 | Okazawa et al. |
| 5,720,028 A | 2/1998 | Matsumoto et al. |
| 5,724,539 A | 3/1998 | Riggle et al. |
| 5,793,763 A * | 8/1998 | Mayes et al. ............... 370/389 |
| 5,867,733 A | 2/1999 | Meyer |
| 5,870,521 A | 2/1999 | Shimoda |
| 5,896,492 A | 4/1999 | Chong, Jr. |
| 5,913,057 A | 6/1999 | Labatte et al. |
| 6,023,754 A | 2/2000 | DuLac et al. |
| 6,065,096 A | 5/2000 | Day et al. |

(List continued on next page.)

Primary Examiner—B. James Peikari
(74) Attorney, Agent, or Firm—Robert C. Kowert; Meyertons, Hood, Kivlin, Kowert & Goetzel, P.C.

(57) ABSTRACT

Several embodiments of a computer system are described which achieve separation of control and data paths during data transfer operations, thus allowing independent scalability of storage system performance factors (e.g., storage system iops and data transfer rate). In one embodiment, the computer system includes a data switch coupled between a host computer and one or more storage devices. A storage controller for managing the storage of data within the one or more storage devices is coupled to the switch. The switch includes a memory for storing data routing information generated by the controller, and uses the data routing information to route data directly between the host computer and the one or more storage devices such that the data does not pass through the storage controller. Within the computer system, information may be conveyed between the host computer, the switch, the one or more storage devices, and the storage controller according to a two party protocol such as the Fibre Channel protocol. The computer system achieves separation of control and data paths using a modified switch and standard host adapter hardware and host driver software. In addition, a two party protocol such as the Fibre Channel protocol is not violated.

6 Claims, 18 Drawing Sheets

U.S. PATENT DOCUMENTS

| | | |
|---|---|---|
| 6,085,285 A | 7/2000 | Lucas et al. |
| 6,098,155 A | 8/2000 | Chong, Jr. |
| 6,101,565 A | 8/2000 | Nishtala et al. |
| 6,115,394 A | 9/2000 | Balachandran et al. |
| 6,134,627 A | 10/2000 | Bak |
| 6,161,208 A | 12/2000 | Dutton et al. |
| 6,167,424 A | 12/2000 | Bak et al. |
| 6,295,296 B1 * | 9/2001 | Tappan ............ 370/392 |

* cited by examiner

SWITCH-BASED SCALABLE PERFORMANCE COMPUTER MEMORY ARCHITECTURE

CONTINUATION DATA

This patent application is a divisional of application Ser. No. 09/358,356 filed on Jul. 21, 1999, now U.S. Pat. No. 6,370,605, which is a continuation-in-part of application Ser. No. 09/262,407, filed on Mar. 4, 1999, now U.S. Pat. No. 6,349,357, and is a continuation-in-part of application Ser. No. 09/261,978, filed on Mar. 4, 1999, now U.S. Pat. No. 6,397,267.

Patent application Ser. No. 09/262,407 entitled "Scalable Performance Storage Architecture" and application Ser. No. 09/261,978 entitled "Redirected I/O for Scalable Performance Storage Architecture" are incorporated herein by reference in their entirety.

BACKGROUND OF THE INVENTION

1. Field of the Invention

This invention relates to data storage systems, and more particularly to data storage systems having a storage device controller interposed between a host computer and one or more data storage devices wherein the controller manages the storage of data within the one or more storage devices.

2. Description of the Related Art

Auxiliary storage devices such as magnetic or optical disk arrays are usually preferred for high-volume data storage. Many modern computer applications, such as high resolution video or graphic displays involving on-demand video servers, may heavily depend on the capacity of the host computer to perform in a data-intensive environment. In other words, necessity for external storage of data in relatively slower auxiliary data storage devices demands that the host computer system accomplish requisite data transfers at a rate that does not severely restrict the utility of the application that necessitated high-volume data transfers. Due to the speed differential between a host processor and an external storage device, a storage controller is almost invariably employed to manage data transfers to/from the host and from/to the storage device.

The purpose of a storage controller is to manage the storage for the host processor, leaving the higher speed host processor to perform other tasks during the time the storage controller accomplishes the requested data transfer to/from the external storage. The host generally performs simple data operations such as data reads and data writes. It is the duty of the storage controller to manage storage redundancy, hardware failure recovery, and volume organization for the data in the auxiliary storage. RAID (Redundant Array of Independent Disks) algorithms are often used to manage data storage among a number of disk drives.

FIG. 1 is a diagram of a conventional computer system 10 including a host computer 12 coupled to a storage controller 14 by a link 16 and two storage devices 18a–b coupled to storage controller 14 by respective links 20a–b. Each storage device 18 may be, for example, a disk drive array or a tape drive. Links 16 and 20a–b may include suitable interfaces for I/O data transfers (e.g., Fibre Channel, small computer system interface or SCSI, etc.) As is evident from FIG. 1, all of the information involved in data transfers between host computer 12 and storage devices 16a–b passes through storage controller 14. Storage controller 14 receives command, status, and data packets during the data transfer.

FIG. 2 is a diagram illustrating an exemplary flow of packets during a data read operation initiated by host computer 12 of FIG. 1. Links 16 and 20a–b in FIG. 1 may be Fibre Channel links, and the data transfer protocol evident in FIG. 2 may be the Fibre Channel protocol. Referring now to FIGS. 1 and 2 together, host computer 12 issues a read command packet identifying storage controller 14 as its destination (XID=H, A) via link 16. Storage controller 14 receives the read command and determines that two separate read operations are required to obtain the requested data; one from storage device 18a and the other from storage device 18b.

Storage controller 14 translates the read command from host computer 12 into two separate read commands, one read command for storage device 18a and the other read command for storage device 18b. Storage controller 14 transmits a first read command packet identifying storage device 18a as its destination (XID=A, B) via link 20a, and a second read command packet identifying storage device 18b as its destination (XID=A, C) via link 20b. Each read command packet instructs respective storage devices 18a–b to access and provide data identified by the read command. Storage device 18a (ID=B) accesses the requested data and transmits a data packet followed by a status packet (XID=B, A) to storage controller 14 via link 20a. Storage device 18b (ID=C) accesses the requested data and transmits a data packet followed by a status packet (XID=C, A) to storage controller 14 via link 20b. Each status packet may indicate whether the corresponding read operation was successful, i.e. whether the data read was valid.

As indicated in FIG. 2, storage controller 14 temporarily stores the data and status at packets in a memory unit within storage controller 14. Storage controller 14 then consolidates the data received from storage devices 18a–b and processes the status packets received from storage devices 18a–b to form a composite status. Storage controller 14 transmits the consolidated data followed by the composite status (XID=A, H) to host computer 12 via link 16, completing the read operation. In the event that the composite status indicates a read operation error, host computer 12 may ignore the consolidated data and initiate a new read operation. In general, the flow of packets depicted in FIG. 2 is typical of a two-party point-to-point interface protocol (e.g., the Fibre Channel protocol).

A typical storage controller includes multiple ports and one or more CPUs coupled to a communication bus, and a memory bus coupling the one or more CPUs to a memory unit. Two parameters are commonly used to measure the performance of a storage system: (1) the number of input/output (I/O) operations per second (iops), and (2) the data transfer rate of the storage system. Generally, the rate of execution of iops by a storage controller is governed by the type, speed and number of CPUs within the storage controller. The data transfer rate depends on the data transfer bandwidth of the storage controller. In computer system 10 described above, all of the data transferred between host computer 12 and storage devices 18a–b is temporarily stored within the memory unit of storage controller 14, and thus travels through the memory bus of storage controller 14. As a result, the data transfer bandwidth of storage controller 14 is largely dependent upon the bandwidth of the memory bus of storage controller 14.

Current storage systems have restricted scalability because of the storage controllers having a relatively inflexible ratio of CPU to bandwidth capability. In other words, as evident in FIGS. 1 and 2, the data transfer rate between host computer 12 and storage devices 18a–b is dependent upon control functions (i.e., command translation and status processing) performed by storage controller 14. This interdependence between iops and data transfer rate results in less efficient scalability of performance parameters. For example, in conventional storage controller architectures, an increase in data transfer rate may require both an increase in data transfer bandwidth and an increase in the number of CPUs residing within the controller.

It would thus be desirable to have a storage controller where control functionality (as measured by the iops parameter) is scalable independently of the data transfer bandwidth (which determines the data transfer rate), and vice versa. It may be further desirable to achieve independence in scalability without necessitating a change in the existing interface protocol managing the host-controller-storage interface.

SUMMARY OF THE INVENTION

Several embodiments of a computer system are described which achieve separation of control and data paths during data transfer operations, thus allowing independent scalability of storage system performance factors (e.g., storage system iops and data transfer rate). In one embodiment, the computer system includes a data switch coupled between a host computer and one or more storage devices. A storage controller for managing the storage of data within the one or more storage devices is coupled to the switch. The switch includes a memory for storing data routing information generated by the controller, and uses the data routing information to route data directly between the host computer and the one or more storage devices such that the data does not pass through the storage controller. Within the computer system, information may be conveyed between the host computer, the switch, the one or more storage devices, and the storage controller according to a two party protocol such as the Fibre Channel protocol. The computer system achieves separation of control and data paths using a modified switch and standard host adapter hardware and host driver software. In addition, a two party protocol such as the Fibre Channel protocol is not violated.

The one or more storage devices, the storage controller, and the switch make up a storage system of the computer system. The switch receives a data transfer command from the host computer and directs the data transfer command to the storage controller. In response to the data transfer command, the storage controller translates the data transfer command into one or more translated data transfer commands, and also generates frame header substitution information. The storage controller transmits the one or more translated data transfer commands and the frame header substitution information to the switch.

The switch routes the one or more translated data transfer commands to appropriate storage device and stores the frame header substitution information within the memory. The switch replaces header information of one or more data frames associated with the data transfer operation with the substitute header information such that the data frames are routed directly between the host computer and the storage device and do not pass through the storage controller.

Each data frame includes header information within a header field, and the header information includes a destination address. The switch routes a given data frame based upon the destination address. The frame header substitution information includes a substitute destination address generated by the storage controller such that when the switch replaces header information of the data frames with the substitute header information, the data frames are routed directly between the host computer and the storage device and do not pass through the storage controller.

When the data transfer command from the host computer is a read command, the substitute destination address is the address of the host computer. The switch receives the one or more data frames associated with the read operation from the one or more storage device, and routes the one or more data frames directly to the host computer such that the data frames do not pass through the storage controller.

When the data transfer command from the host computer is a write command, the substitute destination address is the address of the one or more storage devices. The switch receives the one or more data frames associated with the write operation from the host computer, and routes the data frames directly to the one or more storage devices such that the data frames do not pass through the storage controller.

The frame header substitution information may include target header information and corresponding substitute header information. Upon receiving a data frame, the switch may compare the header information of the data frame to the target header information stored within the memory. If the header information of the data frame matches the target header information, the switch may replace the header information of the data frame with the substitute header information corresponding to the target header information. Following replacement of the header information of the data frame with the substitute header information, the switch may calculate a cyclic redundancy check (CRC) value for the data frame and insert the CRC value into the data frame. The substitute header information may include the substitute destination address as described above. The switch may then route the data frame dependent upon the substitute destination address. As a result, the data frame may move directly between the host computer and the storage device such that the data frame does not pass through the storage controller.

Following a data transfer operation, the switch may receive status information associated with the data transfer operation from the one or more storage devices. The switch may route the status information to the storage controller. In response, the storage device may generate an overall status which may be a consolidation of separate status information from multiple storage devices. The storage controller may transmit the overall status to the switch, and the switch may route the overall status to the host computer.

The one or more storage devices may include multiple disk drives, and the storage controller may manage the one or more storage devices as a RAID (Redundant Array of Independent Disks) array. Accordingly, the storage controller may generate the translated data transfer commands dependent upon the RAID array configuration of the one or more storage devices.

One embodiment of the data switch is a crossbar switch including multiple input and output ports coupled to an array of switching elements. Each input port is adapted for coupling to a transmission medium and receives information via the transmission medium. Each output port is adapted for coupling to a transmission medium and configured to transmit information via the transmission medium. The array of switching elements selectively couples the input ports to the output ports. A switch matrix control unit receives routing information from the input ports and controls the array of switching elements dependent upon the routing information. Each input port includes a memory unit for storing the frame header substitution information. Each input port receives frame header substitution information and stores the frame header substitution information within the memory unit.

During a data transfer operation, one or more of the input ports receives a data frame including header as described above. Each input port receiving a data frame replaces the header information of the data frame with the substitute header information stored within the memory unit. As a result, the substitute destination address becomes the destination address, and the input port provides the destination address to the switch matrix control unit as the routing information.

Each input port may include a port control unit configured to control the input port and an input queue for storing received information, wherein the port control unit is coupled to the memory unit and to the input queue. When the data frame is received, the data frame is stored within the input queue. The port control unit may compare the header information of the data frame to the target header information stored within the memory. If the header information of the data frame matches the target header information, the port control unit may replace the header information of the data frame with the substitute header information corresponding to the target header information. After the port control unit replaces the header information of the data frame with the substitute header information, the port control unit may calculate a CRC value for the data frame and inserts the CRC value into the data frame. The switch matrix control unit couples the input port to an output port via the array of switching elements dependent upon the substitute destination address. As a result, the data frame may move directly between the host computer and the storage device such that the data frame does not pass through the storage controller.

BRIEF DESCRIPTION OF THE DRAWINGS

Other objects and advantages of the invention will become apparent upon reading the following detailed description and upon reference to the accompanying drawings in which.

Figure 1:
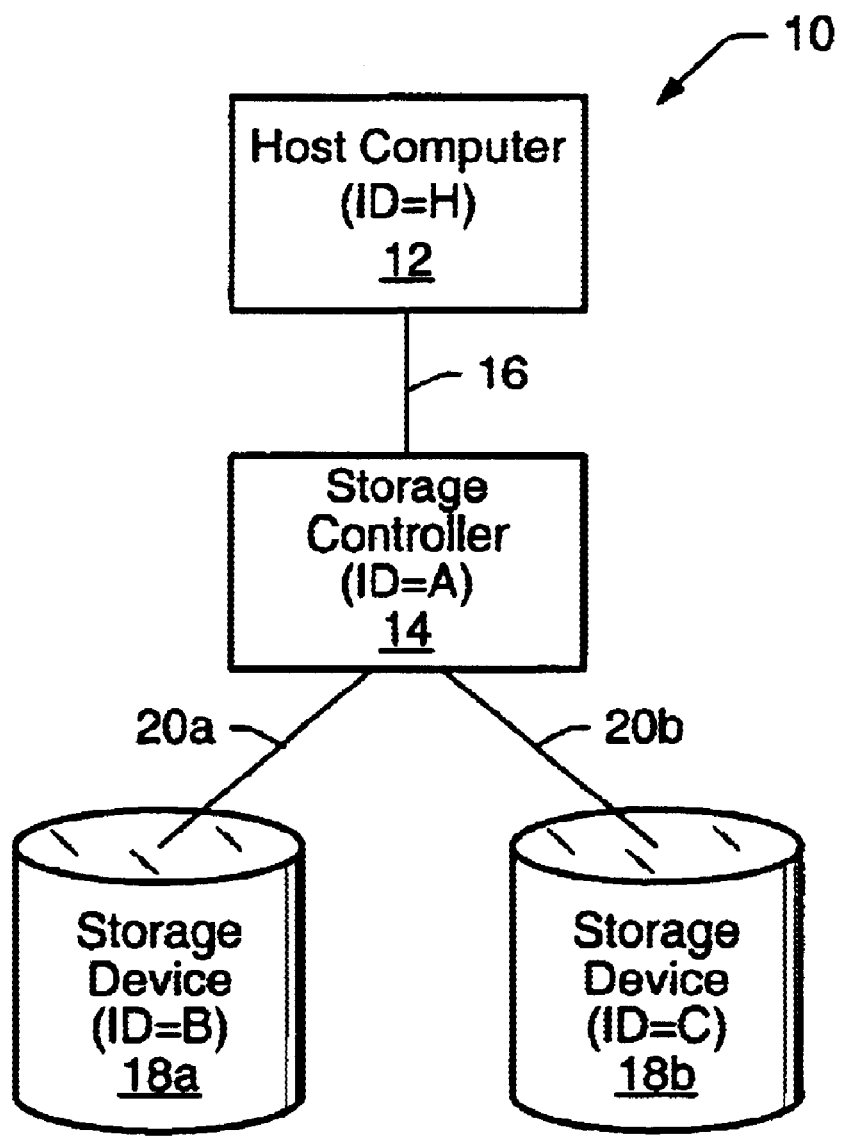
FIG. 1 is a diagram of a conventional computer system including a host computer coupled to a storage controller and two storage devices coupled to the storage controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3A:
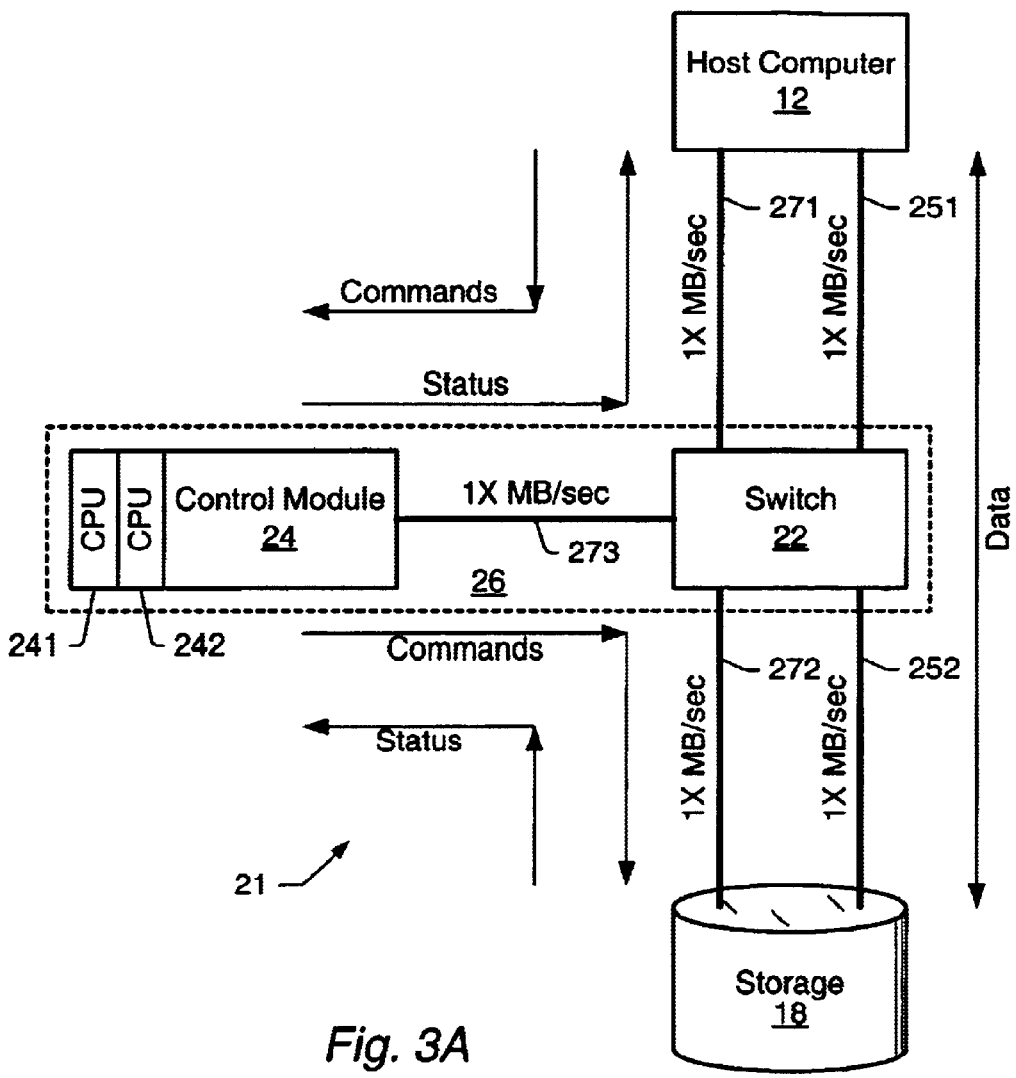
FIGS. 3A, 3B, 3C, 3D, 3E and 4A show several different embodiments of a computer system which achieves separation of data and control paths between the host computer and a storage device.

Referring now to FIG. 3A, a block diagram of a computer system 21 including one embodiment of a storage controller 26 is shown. The storage controller 26 includes a control module 24 and a switch 22. The control information (including command and status signals) flows over a control path defined by the interconnecting links 271, 272 and 273. On the other hand, the data flows directly between the host computer 12 and the storage device 18 through the switch 22 and over the data path defined by the interconnecting links 251 and 252. This is different from the conventional storage controller 14 (FIG. 1) where all command, status and data information is passed between the host computer 12 and the storage controller 14 as well as between the storage controller 14 and storage devices 18a–b.

The storage controller architecture described herein is organized into functional units. The control module receives data transfer commands (read or write commands) from the host computer 12 through the control path including the links 271 and 273. The control module 24 translates a data transfer command from the host 12 prior to transmitting the translated commands to the storage device 18 over the links 273 and 272. The control module 24 performs translation of the command received from the host 12 into one or more commands depending on the data transfer request (read or write request) specified by the command from the host. The storage controller 26 may store data into the storage device 18 using, for example, one or more RAID (Redundant Array of Independent Disks) levels. In this case, the translated set of commands from the control module 24 may also include appropriate commands for the RAID level selected. The control module 24 may include one or more processors labeled 241 and 242 in FIG. 3A to perform various control functions (or iops), including the translation of the commands received from the host computer 12.

In general, the RAID level is determined when the storage volume is set up. At that time, the system software or the user may decide which RAID level to use. For example, mirroring under RAID 1 may be used. Alternatively, RAID 5 with parity calculation may be chosen. A combination of more than one RAID level (for example, RAID 0 and RAID 1) may also be implemented. In one embodiment, parts of the storage volume may be stored under different RAID levels or combination of RAID levels. The control module 24 may be provided with the necessary information for the RAID level selected for data storage. This information may then be utilized by the control module 24 when issuing appropriate commands during data write operations. In some embodiments, during a data read operation, there may be no choice of RAID level and any redundancy present in the data read may be ignored.

In one embodiment, the control module 24 dynamically selects one or more RAID levels (from the group of RAID levels identified when storage volume was set up) for the data to be written into the storage device 18. Depending on the write command received from the host 12 and depending on the prior storage history for specific types of writes from the host 12, the control module driving software may instruct the storage device 18 to divide the data to be stored into more than one block and each block of data may be stored according to a different RAID algorithm (for example, one data block may be stored according to RAID 1 whereas another data bock may be stored according to RAID 5) as indicated by the commands from the control module 24 to the storage device 18. In an alternative embodiment, the control module 24 may simply instruct the storage device 18 to store the data received from the host 12 using one fixed, predetermined RAID level (for example, all writes may be RAID 5 writes).

The storage device 18 may typically include more than one storage disk and the storage disks (not shown) may be organized into disk arrays in case of RAID-based storage architecture. The storage device 18 may be one or more discrete physical devices, e.g., disk drives, tape drives, etc. Alternately, the storage device 18 may be a storage subsystem with more than one disk drives and a resident RAID controller. Additionally, the storage device 18 may allow hot-swapping in the event of a disk failure. The storage disks may implement magnetic, optical or any other method of storing high-volume data. Some examples of storage disks include CD ROMs, magnetic tapes, video disks, etc. Protection from power failures may also be part of the storage device architecture. In one embodiment, the storage controller 26 may manage storage redundancy built into the storage device 18. The storage controller 26 may also be configured to manage data recovery in the event of a storage device hardware failure. The storage controller 26 may also issue appropriate recovery commands in the event of data volume rebuilding after the hardware failure. One or more RAID algorithms may also be used by the storage controller 26 (particularly, by the control module 24) to manage such data storage and recovery operations. In an alternative embodiment, the storage device 18 may include a resident RAID controller (not shown). In this configuration, the control module 24 may not need to perform RAID operations and may simply issue data transfer commands without specifying the RAID levels for data storage.

Figure 3B:
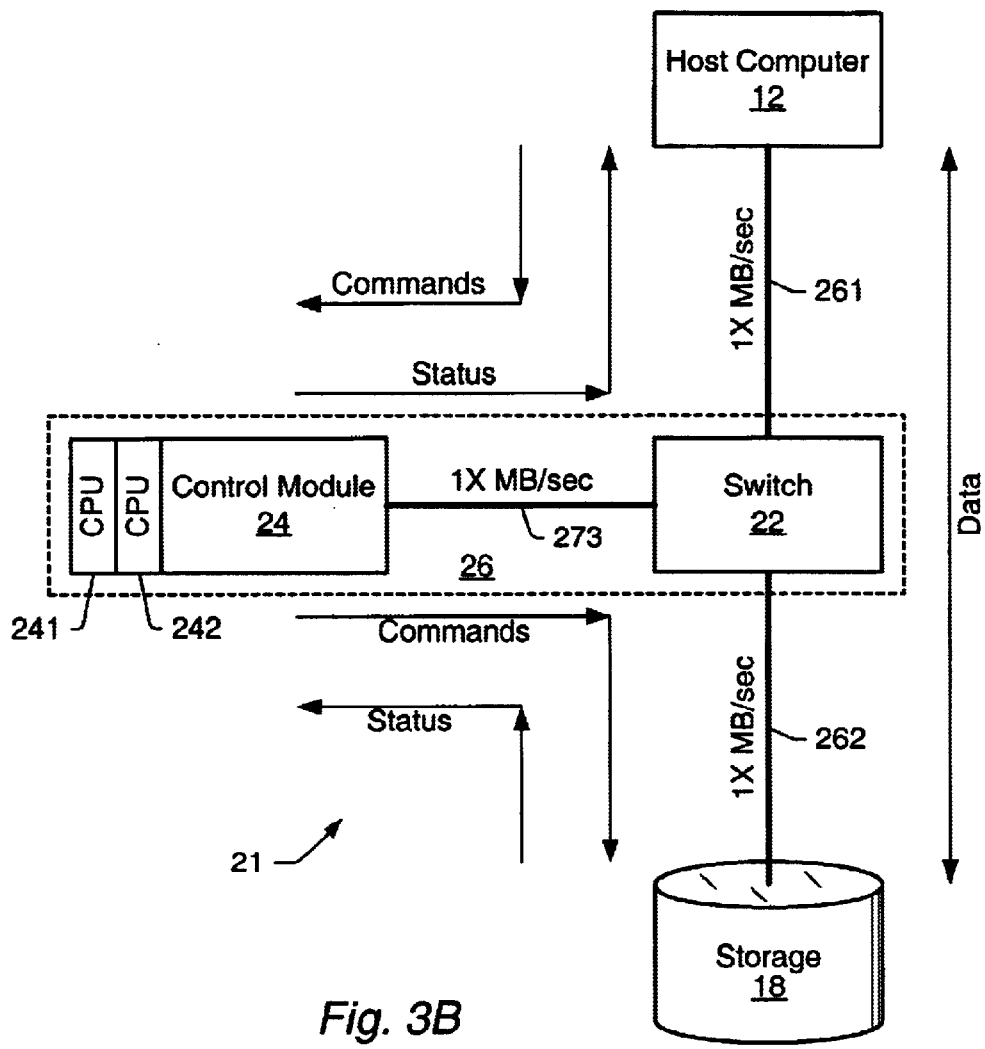

It is noted that the control path (which includes interconnect links 271, 272 and 273) and the data path (which includes interconnect links 251 and 252) may be physically separate. However, as command and status information requires relatively very small bandwidth as compared to the data transfer bandwidth, the computer system 21 may be designed where some conductors over the links 271, 251, 272 and 252 may share control and data information. In other words, the control and the data paths may be at least partially physically separate in an embodiment. Alternatively, the control and the data paths may be physically inseparable. One such embodiment is illustrated in FIG. 3B where the same physical links, 261 and 262, may carry control as well as data signals. The switch 22 may be configured not to pass data through the control module 24 so as to allow independent scalability of control and data functions. The link 273 between the control module 24 and the switch 22 may have less bandwidth than the links 261, 262 (FIG. 3B) or links 251, 252 (FIG. 3A) connecting the host 12, the switch 22 and the storage device 18.

Figure 3C:
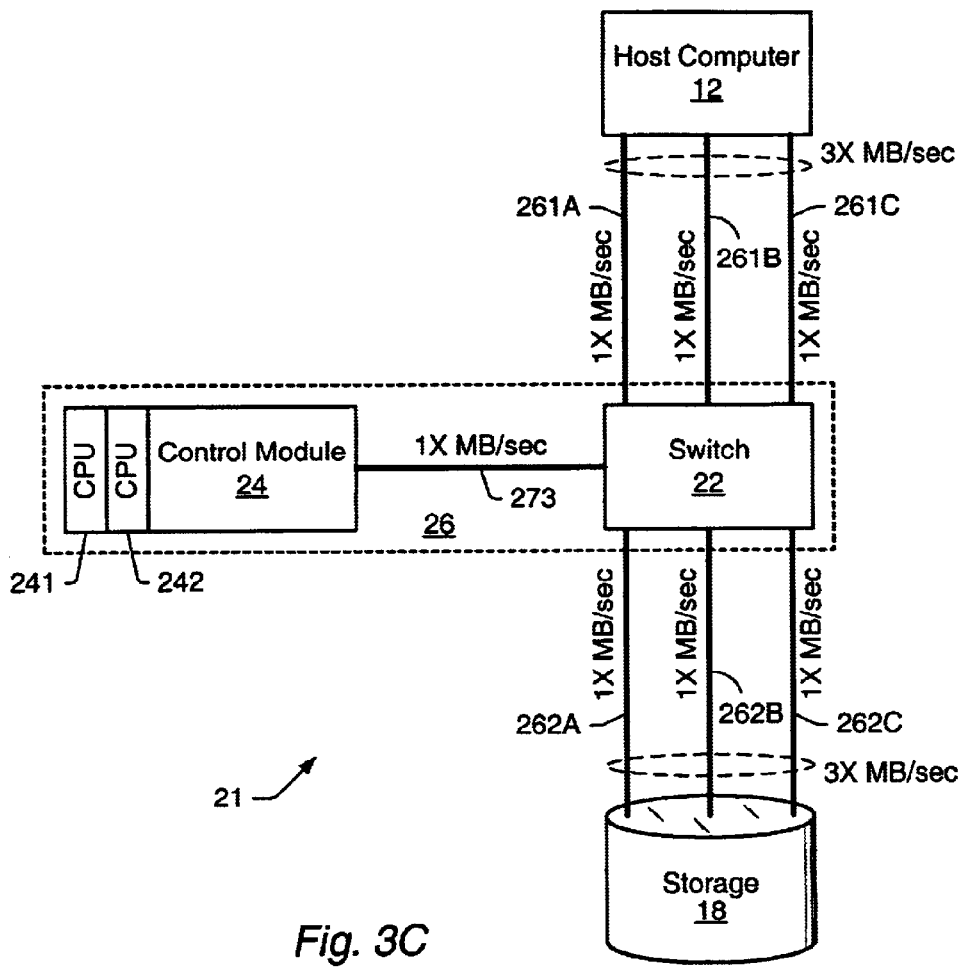

The storage controller architecture described herein improves scalability because of the independence of control and data functions performed by the storage controller 26. For example, when more controller bandwidth is desired, the bandwidth of the data handling components (i.e., the switch 22, the host 12 and the storage device 18) as well as the bandwidth of the interconnect (for example, of the links 261 and 262) may be increased. FIG. 3C illustrates one such embodiment where the interconnect links 261 and 262 in the computer system 21 of FIG. 3B are replicated to have a set of six interconnect links, 261A–261C and 262A–262C. The total data transfer bandwidth is shown to be three times more than the control bandwidth. It is understood that the rate of digital information transfer is shown to be in MB/sec, but may be conveniently selected to be GB/sec or any other suitable rate as supported by the system architecture. Thus, selective scalability of data paths may be achieved without attendant costs of increasing rate of execution of I/O operations by the control module 24.

Figure 3D:
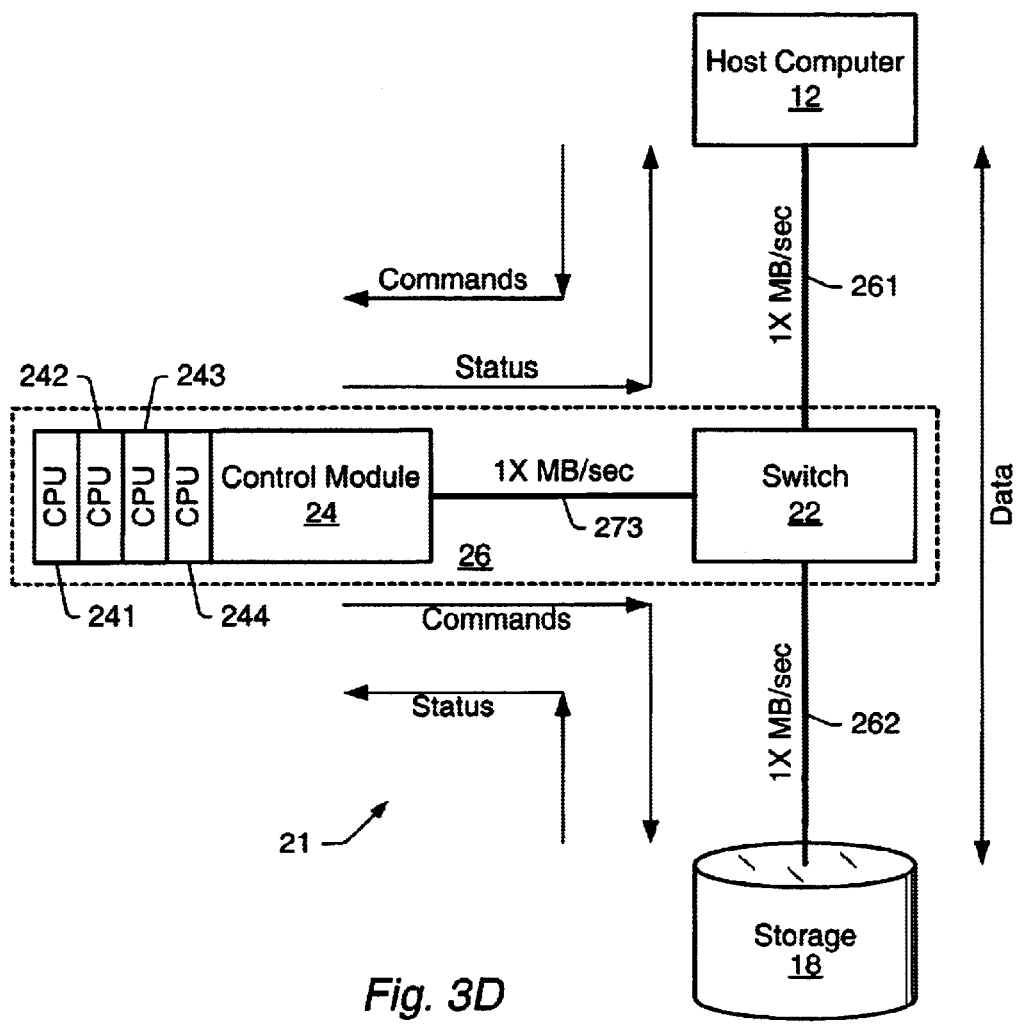
Figure 3E:
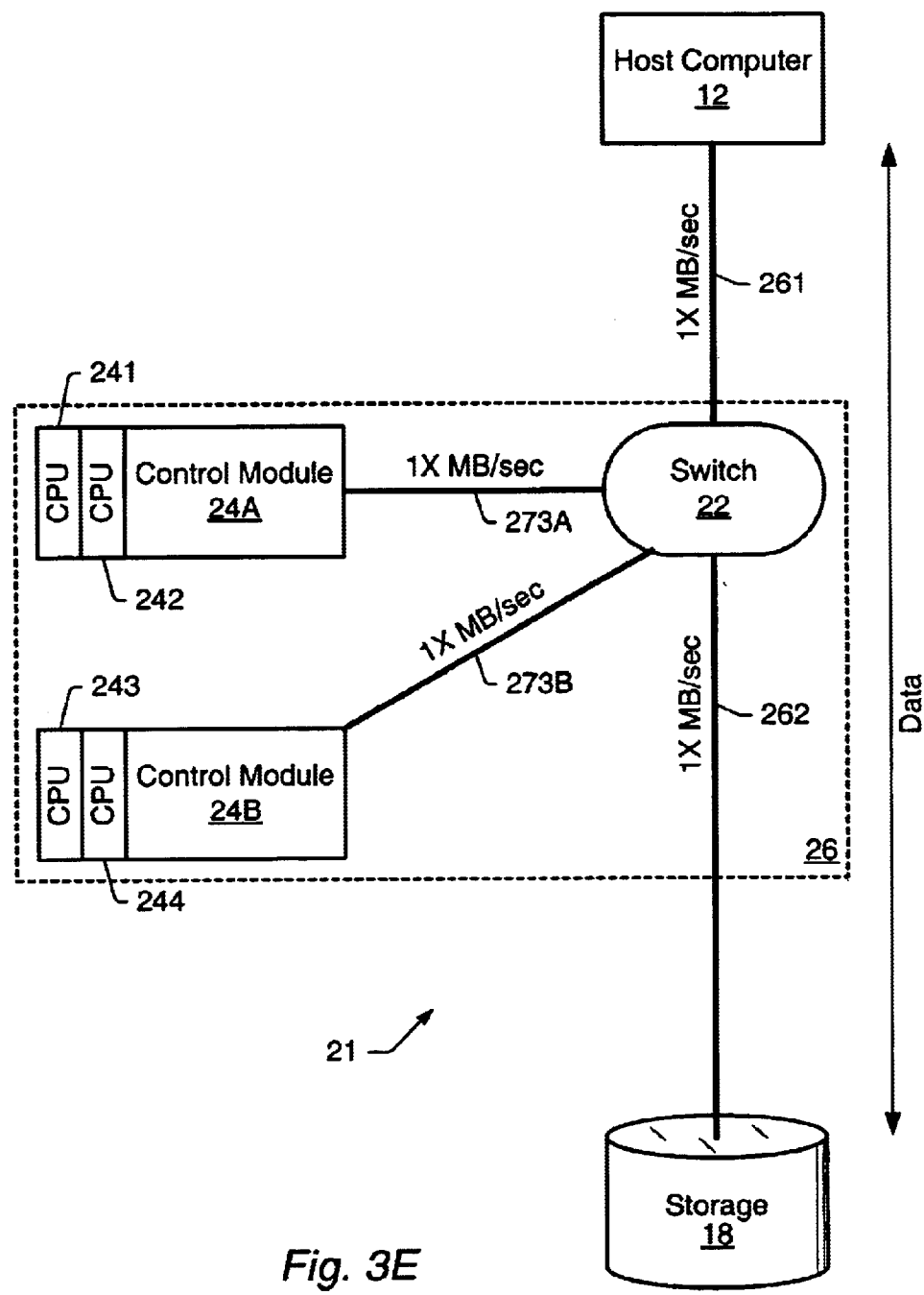

On the other hand, if more iops are required, more CPUs or processing units may be added to the control module 24. FIG. 3D shows one such embodiment where the storage controller 26 is modified to include four processors, labeled 241–244, for increased iops. Alternatively, the storage controller 26 may add another control module to share the iops load. FIG. 3E shows a storage controller 26 having two control modules 24A, 24B connected to the switch 22 via two independent interconnect links 273A and 273B respectively. The storage controller 26 may thus be made expandable to include additional control modules when increased iops are desired. Some of the arrows indicating directions of flow of command, status and data signals have been omitted from FIGS. 3C and 3E for the sake of clarity only. Each of the FIGS. 3A–3E, therefore, illustrates how the data transfer functionality of a storage controller may be made independent of its control functionality.

Figure 4A:
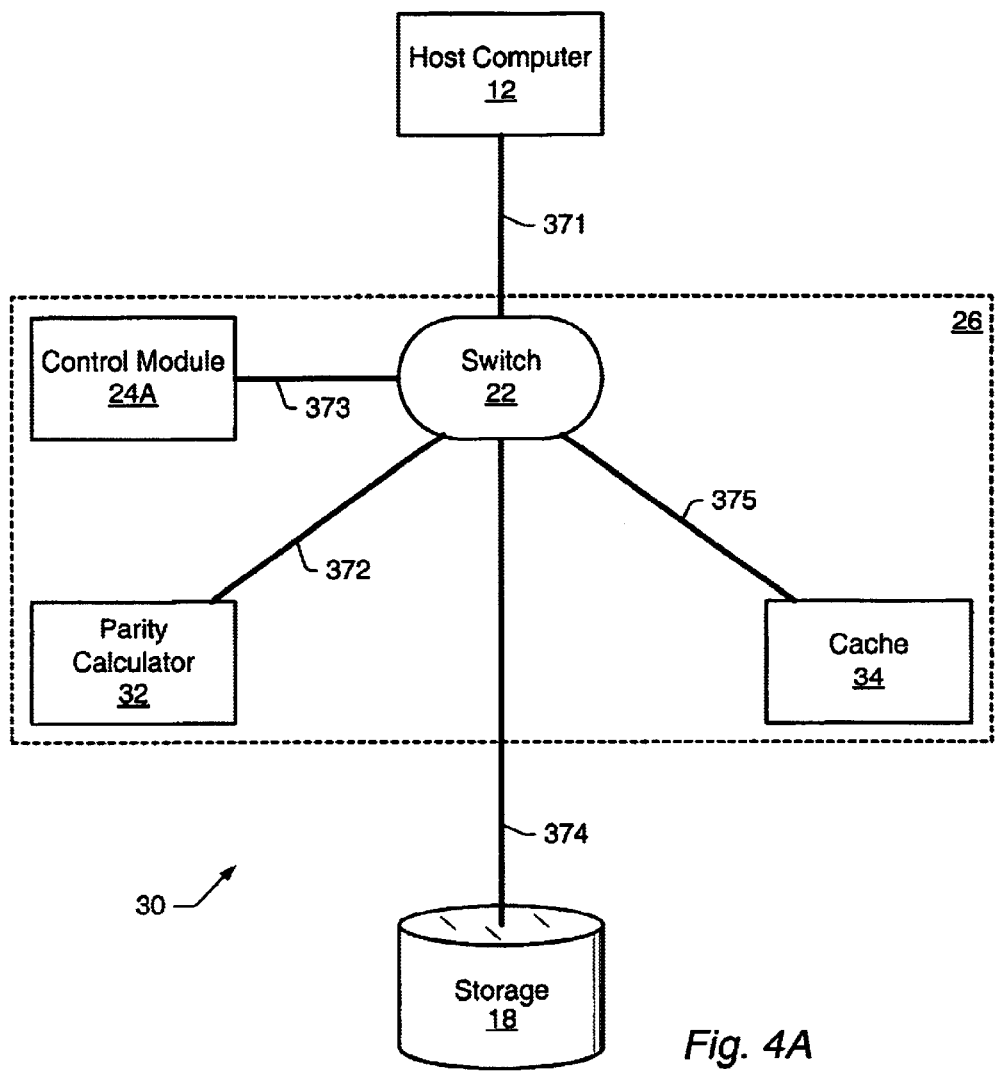

Referring now to FIG. 4A, a computer system 30 with a different embodiment of the storage controller 26 is shown. The storage controller 26 is shown to include a parity calculator or parity logic 32 and a cache memory or memory module 34. In one embodiment, the parity module 32 is combined with the cache memory module 34 eliminating additional interconnect links. All the circuit elements are shown coupled to the switch 22 via respective links 371–375. The switch 22 is shown to have five ports to connect five system elements—the host 12, the control module 24, the parity logic 32, the storage device 18 and the cache memory 34. The switch may have additional ports as described later with reference to FIG. 5.

The memory module 34 primarily functions as a "short-term" storage for the data being transferred to/from the storage device 18. Generally, because of the higher speed of the cache memory 34, small volume of data may be transferred from the host 12 to the memory module 34 prior to finally storing the data into the storage device 18. Alternately, data read from the storage device 18 may also be "temporarily" stored in the cache memory 34 prior to finally transferring the data to the host computer 12 for further processing. The cache memory 34 preferably has persistence over power failure so as to preserve data integrity and to facilitate data recovery by the control module 24.

Generally, on write caching, the host 12 sends the transaction to the storage controller 26 and the control module 24 issues appropriate commands to the switch 22 to store the data into the cache memory module 34. The control module 24 also notifies the host computer 12 that the write operation is completed. If the host 12 wants to read that data, then the control module 24 allows retrieval of the data from the cache memory 34. The control module 24 schedules flushing of the cache data to the storage device 18 based on how recently the data has been accessed, space needed in the cache 34 for another data storage operation, etc. On read caching, the storage controller 26 causes the data requested by the host to be read from the storage device 18 and stored in the cache 34. The storage controller 26 may cause additional non-requested data to be stored in the cache 34 in anticipation of future read requests from the host 12. If the requested data is in the cache 34, then the host may receive it sooner than if the controller 26 has to access the storage device 18 to retrieve the requested data.

The memory module 34 may also include a cache controller (not shown) to manage the data transfers to/from the cache memory 34. The cache controller typically would receive one or more commands from the control module 24 and would accordingly prepare the data transfer to/from the cache memory 34. The cache controller may also initiate data transfer from the cache memory 34 by sending appropriate data write command to the control module 24, which, in turn, may prepare the storage device 18 to receive the data being offloaded from the cache 34. Similarly, data from the cache memory 34 may also be transmitted to the host computer 12 with the help of the control module 24. Some exemplary RAID-based data transfer operations are described later in conjunction with FIG. 4B. In an alternative embodiment, the cache controller or cache manager (not shown) may be a part of the control module 24. The cache manager in the control module may also perform the same cache management functionality as discussed here with reference to the embodiment of FIG. 4A.

The parity calculator module 32 calculates parity for the data being written into the storage device 18 to facilitate data error detection and correction during retrieval of stored data. The parity calculator preferably receives parity calculation commands from the control module 24 after the control module decodes the command sent from the host computer 12. In one embodiment, the parity calculator 32 computes even-parity. In an another embodiment, odd-parity may be calculated. In yet another embodiment, the parity calculator module 32 may employ any suitable error control logic, such as an Error-Correcting Code (ECC) algorithm. The parity logic 32 may determine the minimum size of data block for which parity may be calculated. Larger data blocks may be divided into separate data blocks for parity calculation purpose. The parity calculator 32 may include necessary storage or memory to temporarily save the data for which parity is being calculated. After parity calculation is complete, the parity calculator 32 may initiate transfer of parity information to the storage device 18. The storage device 18 may place the received parity information at appropriate storage locations depending on the storage algorithm, e.g., the RAID level, indicated by the control module 24 or, when applicable, by the resident RAID controller in the storage device.

As noted earlier, the control module 24 receives commands from the host computer 12, decodes and translates the received commands, and transmits one or more translated commands to the storage device 18. In implementing a data transfer operation, the control module 24 in the embodiment of FIG. 4A may also transmit a portion of translated commands to appropriate circuit elements including the parity logic 32 and the cache controller (not shown). Similarly, the control module 24 may receive status information signals from various circuit elements, e.g., cache controller, storage device etc. via the switch 22. Finally, the control module 24 may transfer the status information to the host computer 12 via switch 22 and over the control path (links 371 and 373).

The control module 24 may include one or more processors (CPUs) as shown in FIGS. 3A–3E to process the command and status information from various circuit elements. In the event that the storage device 18 comprises more than one disk drive, the control module 24 may also include a drive selection logic to instruct the storage device 18 regarding the drive to place the data in. The selection of drive may further depend on the data storage algorithm, such as a RAID algorithm, implemented by the storage controller 26. For example, read or write operations on RAID volumes may involve more than one physical drive (in case of multiple-drive storage). The control module 24 may therefore issue necessary data transfer commands to store or retrieve data from among a number of storage drives. The control module 24 further includes interface logic or interface port (not shown) to transmit and receive various command and status information via the switch 22.

As mentioned before, the interconnect links, 371 through 375, may include physically separate data and control paths or may have shared data and control lines. Further, the link interconnects may employ serial or parallel data transfer modes. Some examples of an interconnect architecture include a Fibre Channel, a parallel electrical bus, a USB bus, an ATM bus, a HIPPI interface, a SCSI bus, a FireWire bus, etc. The storage controller 26 may also be coupled to the host 12 and the storage device 18 via a Fibre Channel loop interface (FC-AL) or a Serial Storage Architecture (SSA) interface. The arbitrated loop (FC-AL) may accomplish the same function as the switch when transferring information between any two nodes on the loop.

Figure 5:
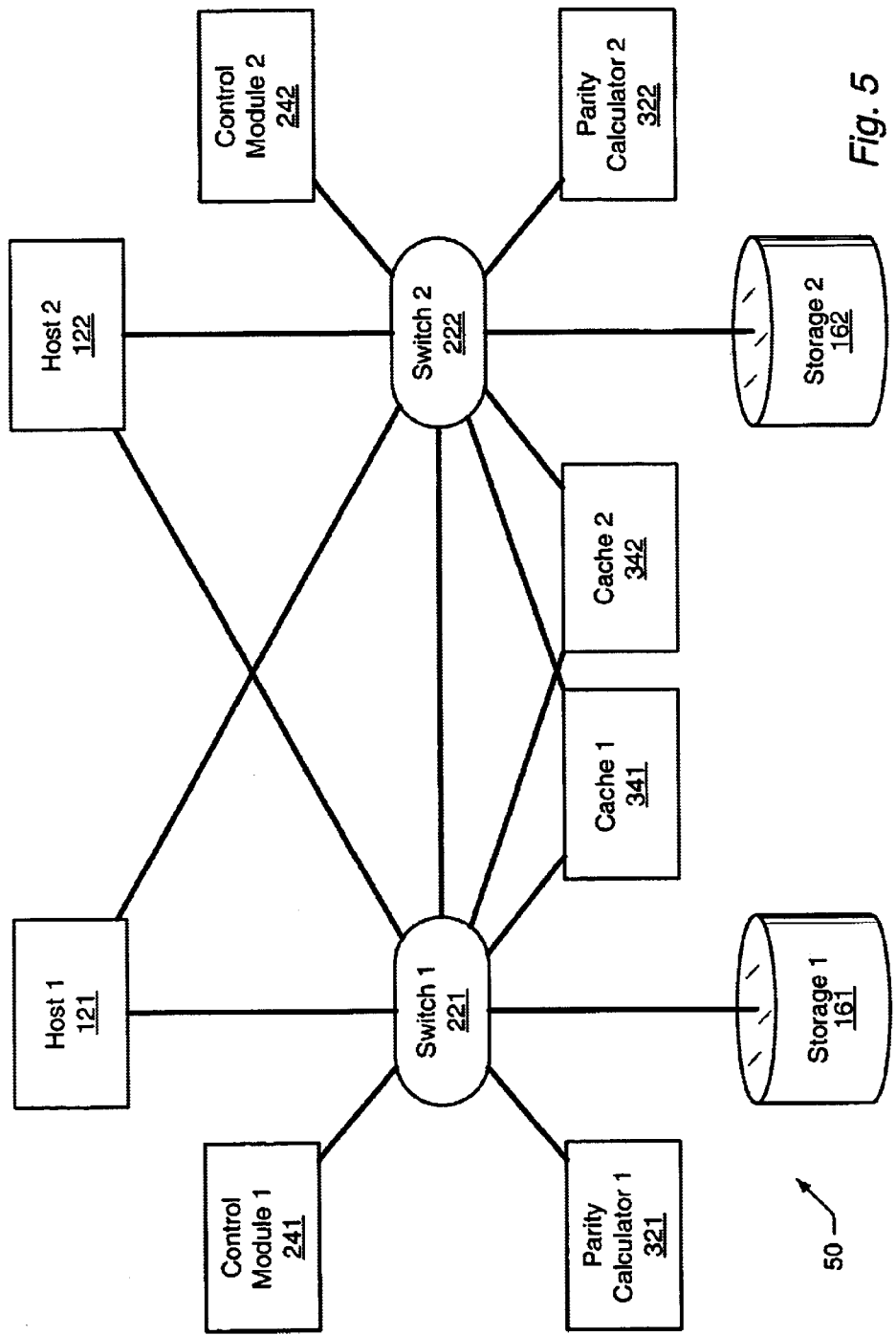
FIG. 5 illustrates a computer system in an exemplary fault-tolerant configuration and including a data storage system with scalable performance.

The switch 22 in the storage controller 26 functions to route command, status and data information between two or more circuit elements. In one embodiment, the switch may have sufficient number of ports to allow two hosts to simultaneously access the switch for pertinent data transfer operations involving the storage device. One such implementation of such a multi-ported switch 221 is illustrated in FIG. 5. The switch 22 may be configured to send data to multiple places at the same time. This replication "on the fly" saves in latency and reduces bandwidth requirements. For example, typical multiple destinations during a data write operation may include the cache memory 341, the cache mirror 342, and the parity calculator 321 in the embodiment of FIG. 5.

The switch 22 may need to be configured depending on the interface standard (SCSI, SSA, Fibre Channel, ATM, etc.) for the interconnect links 371–375. Other remaining modules, i.e., the control module 24, the parity logic 32 and the cache memory 34, may be constructed from standard components. Similarly, host adapters (not shown) and one or more storage devices may be configured from readily available components.

In one embodiment, the host 12 to controller 26 and the controller 26 to storage device 18 links, 371 and 374 respectively, implement SCSI protocol over Fibre Channel. As is known in the art, a Fibre Channel port simply manages a point-to-point connection between itself and the Fibre Channel fabric (here, the switch 22). Fibre Channel is a high performance serial link supporting its own, as well as other higher level protocols such as FDDI (Fibre Distributed Data Interface), SCSI, HIPPI, IPI (Intelligent Peripheral Interface), etc. Fibre Channel typically provides control and complete error checking over the Fibre Channel link. A Fibre Channel link includes two unidirectional fibres transmitting in opposite directions with their associated transmitter and receiver. Each fibre is attached to a transmitter of a port at one end and a receiver of another port at the other end. A Fibre Channel may operate at a variety of speeds, for example, 133 Mbits/s, 266 Mbits/s, 1 Gbits/s, etc. Fibre Channel transmission distances vary depending on the combination of Fibre Channel speed and the fibre media (electrical or optical).

Fibre Channel has two parties: (1) an originator or an initiator port, and (2) a responder or a target port. The initiator sends the command to the target. The target decodes the command and data is transferred to or from the initiator depending on the command. After the completion of data transfer, the target sends status information to the initiator. The status information indicates the status (i.e., valid data transfer, error during data transfer, etc.) of the corresponding data transfer operation initiated by the initiator.

The scalable performance storage architecture (for example, FIGS. 3A–3E and 4A) may employ a three party exchange. The initiator (the host 12) sends commands to the target (the control module 24), but the data is transferred directly between the storage device 18 and the host 12. In case of a Fibre Channel interface standard, such a three-party operation may require the switch 22 to have added capabilities. One of the most important capabilities is to be able to redirect the Fibre Channel data as required by the Fibre Channel protocol. In one embodiment, additional hardware is added to the switch 22 to replace a destination field in a data packet received from the storage device 18 with the node address of the host 12. This effectively converts storage device data packets into controller data packets as required by the fibre protocol for communication between the host 12 and the control module 24. A detailed explanation of data redirection over Fibre Channel may be found in the co-pending patent application, which is incorporated herein by reference in its entirety, titled "Apparatus and Method for Streamlining Data Transfer with Existing Interconnect Bandwidth", filed on Oct. 28, 1996 and having Ser. No. 08/742,602.

Figure 4B:
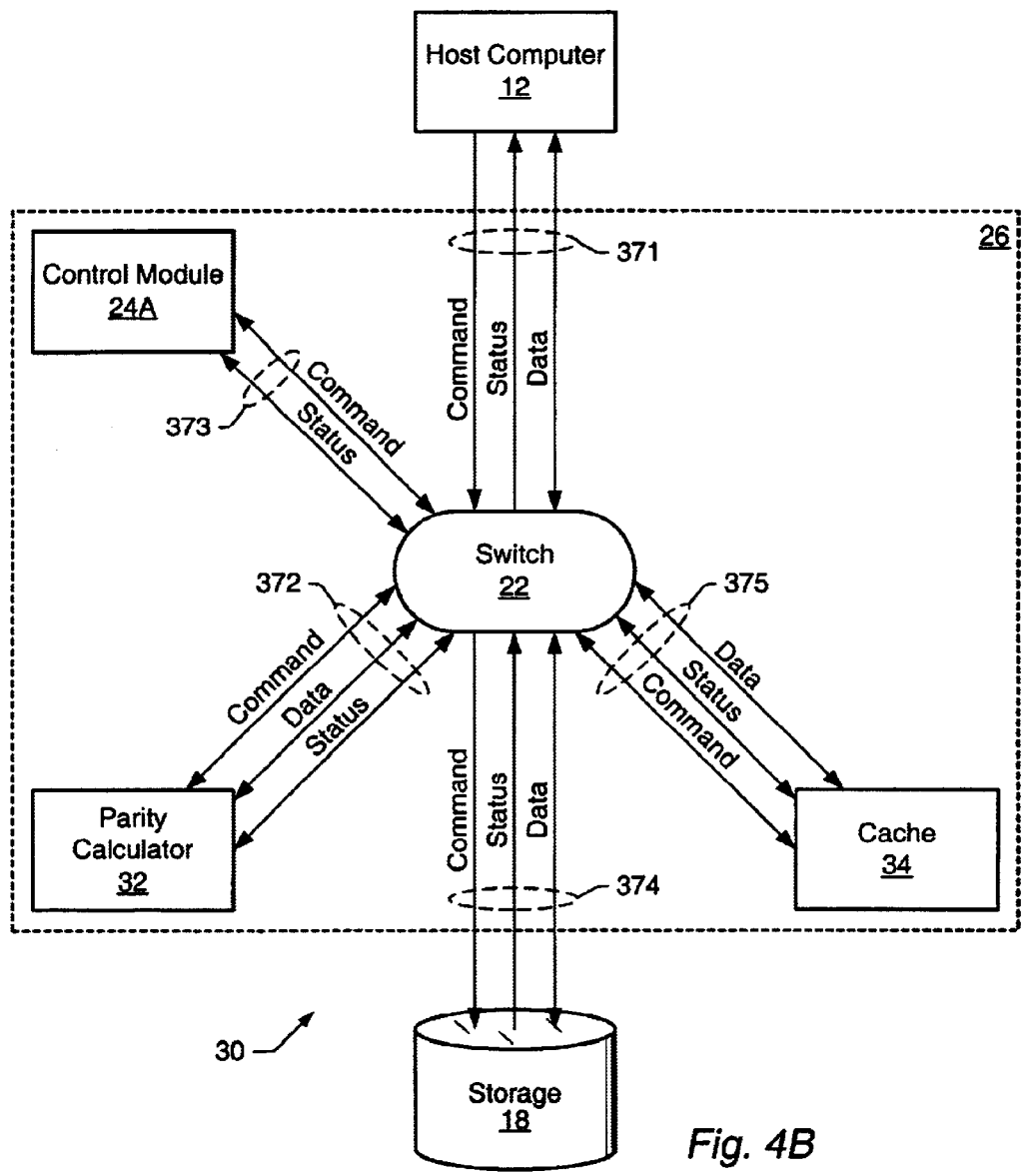
FIG. 4B shows an exemplary flow of command, status, and data packets within the computer system of FIG. 4A.

Referring now to FIG. 4B, an exemplary flow of command, status and data packets for the computer system 30 in FIG. 4A is shown. As mentioned before, the interconnect links may have physically separate data and control paths or may have shared electrical or optical conductors for data and control paths. As described earlier, the separation of data transfer and control functions may essentially be implemented in any given interconnect protocol regardless of whether the protocol employs packetized information transfer or not.

FIG. 4B shows internal flow of data and control packets over the links 371–375 for an embodiment where the interconnect links 371–375 are SCSI over Fibre Channels, and the switch 22 is modified to manage direct data transfer from the storage device 18 to the host 12 as previously described. It is noted, however, that the flow of data and control packets as generally depicted in FIG. 4B may be implemented in any suitable interface protocol in addition to the Fibre Channel protocol, with or without minor modifications. Further, the following sample read and write operations are described with reference to various RAID levels. However, it is evident that any data storage management algorithm may be employed along with the scalable performance storage architecture in, for example, FIGS. 3A–3E and 4B to accomplish fault tolerance and reliable data storage.

The following examples illustrate sequence of operations executed by the scalable storage controller 26 in routing the command, status and data packets in the computer system 30 of FIG. 4A or 4B. It is noted that all information transfers between two modules are routed via the switch 22.

(1) RAID 1 or RAID 5 Read Operation (Storage to Host):
 (i) Read command is sent by the host to the control module.
 (ii) Control module determines which drives in the storage are involved.
 (iii) Control module issues routing information to the switch.
 (iv) Control module issues one or more read commands to drives in the storage.
 (v) One or more data units are transferred from drives through switch to host.
 (vi) Ending status from drives sent to the control module.
 (vii) Ending status sent from the control module to the host.

(2) RAID 1 or RAID 5 Read Operation (Cache to Host):
 (i) Read command is sent by the host to the control module.
 (ii) Control module issues routing information to the switch.
 (iii) Control module issues read command to the cache.
 (iv) One or more data units are transferred from the cache through the switch to the host.
 (v) Ending status from the cache is sent to the control module.
 (vi) Ending status is sent from the control module to the host.

(3) RAID 1 or RAID 5 Write Operation (Host to Cache):
 (i) Write command is sent by the host to the control module.
 (ii) Control module issues routing information to the switch.
 (iii) Control module issues transfer ready status to the host.
 (iv) Data is transferred from the host to the cache via the switch. In a fault-tolerant configuration (e.g., FIG. 5), the data may also be simultaneously transferred to any other cache in the system via the same switch, i.e. the switch 22.
 (v) Ending status from the cache 34 (or, from the caches 341, 342 for the configuration in FIG. 5) is sent to the control module.
 (vi) Ending status sent from the control module to the host.

(4) RAID 5 Write Operation (Cache to Storage):
   (i) Write command initiated by controller cache manager.
   (ii) Control module determines which drives in the storage are involved.
   (iii) Control module issues routing information to the switch.
   (iv) Control module issues commands to the cache and to the parity calculator.
   (v) Data transferred from the cache through the switch to drives and to the parity calculator.
   (vi) Parity information transferred from the parity calculator to one or more drives through the switch.
   (vii) Ending status sent from the drives to the control module.

(5) RAID 5 Write Operation (Host to Storage):
   (i) Write command is sent by the host to the control module.
   (ii) Control module determines which drives in the storage are involved.
   (iii) Control module issues routing information to the switch.
   (iv) Control module issues command information to the parity calculator.
   (v) Control module issues transfer ready status to the host.
   (vi) Data transferred from the host to the parity calculator and to the drives via the switch.
   (vii) Parity information transferred from the parity calculator to one or more drives through the switch.
   (viii) Ending status sent from the drives to the control module.
   (ix) Ending status sent from the control module to the host.

(6) RAID 1 Write Operation (Cache to Storage):
   (i) Write command initiated by controller cache manager.
   (ii) Control module issues routing information to the switch.
   (iii) Control module issues commands to the cache controller.
   (iv) Data transferred from cache through switch to the drives (primary and mirror).
   (v) Ending status sent from the drives to the control module.

(7) RAID 1 Write Operation (Host to Storage):
   (i) Write command is sent by the host to the control module.
   (ii) Control module determines which drives in the storage are involved.
   (iii) Control module issues routing information to the switch.
   (iv) Control module issues transfer ready status to the host.
   (v) Data transferred from the host through switch to the drives (primary and mirror).
   (vi) Ending status sent from the drives to the control module.
   (vii) Ending status sent from the control module to the host.

Data read or write operations involving other RAID levels may also be carried out in a similar manner.

Referring now to FIG. 5, a computer system 50 with a fault-tolerant scalable performance storage architecture is illustrated. The exemplary arrangement of basic modules in FIGS. 3A–3E and 4A may be replicated to accomplish desired fault tolerance. In one embodiment, any data written into one of the caches 341 or 342 is automatically replicated into the other remaining cache. In the configuration of FIG. 5, a failure of one of the switches, control modules, caches or parity calculators may not affect data storage capability of the computer system 50. Redundancy may be increased further, if desired. The storage controllers in FIG. 5 are dual-ported. Especially, the switches 221 and 222 have sufficient number of ports to allow simultaneous access by the hosts 121 and 122. This arrangement not only improves reliability for data storage and retrieval, but also reduces latency in data transfers (for example, reduced latency in backing up the data into the storage devices 161 and 162). The switch hardware may be configured to include additional ports to accomplish desired level of redundancy and fault tolerance. The interconnect links in FIG. 5 may be Fibre Channels or SCSI buses or any other suitable interface architecture as earlier described with reference to FIGS. 3A–3E, 4A and 4B.

As mentioned earlier, all command, status and data transfers are routed through one or more of the switches. A switch properly configured to function under a given interface protocol may thus accomplish independence of data transfer and control functionality for its corresponding storage controller.

Some examples of performance scalability using independence in data transfer and control functionalities of a storage controller (as illustrated through FIGS. 3A–5) are: (1) to increase rate of execution of I/O operations (iops), more processing units (CPUs) may be added to the control module in the storage controller or more control modules may be added to the storage controller architecture (FIGS. 3D, 3E); (2) to increase data read bandwidth, the bandwidth of the data path connecting the host, the switch and the storage device may be increased without necessarily increasing the bandwidth of the control path linking the control module (FIG. 3C); (3) to increase bandwidth of RAID 5 writes to the storage, the bandwidth of the data path linking the storage device, the switch and the parity calculator may be increased; and (4) to increase bandwidth of data writes to the cache, the bandwidth of the data path connecting the host, the switch and the cache may be increased.

As described earlier, independent scalability of performance metrics (iops and data transfer bandwidth) under a typical two-party point-to-point interface protocol (e.g., the Fibre Channel protocol) may require a non-standard or modified switch (e.g., the switch 22 in FIGS. 3A–3E, 4A and 4B) to route the data. A standard Fibre Channel switch (for Fibre Channel protocol) or any other switch corresponding to the two-party protocol involved may, however, still be used to accomplish the same independence in storage performance scalability as described below with reference to FIGS. 6 and 7.

Figure 6:
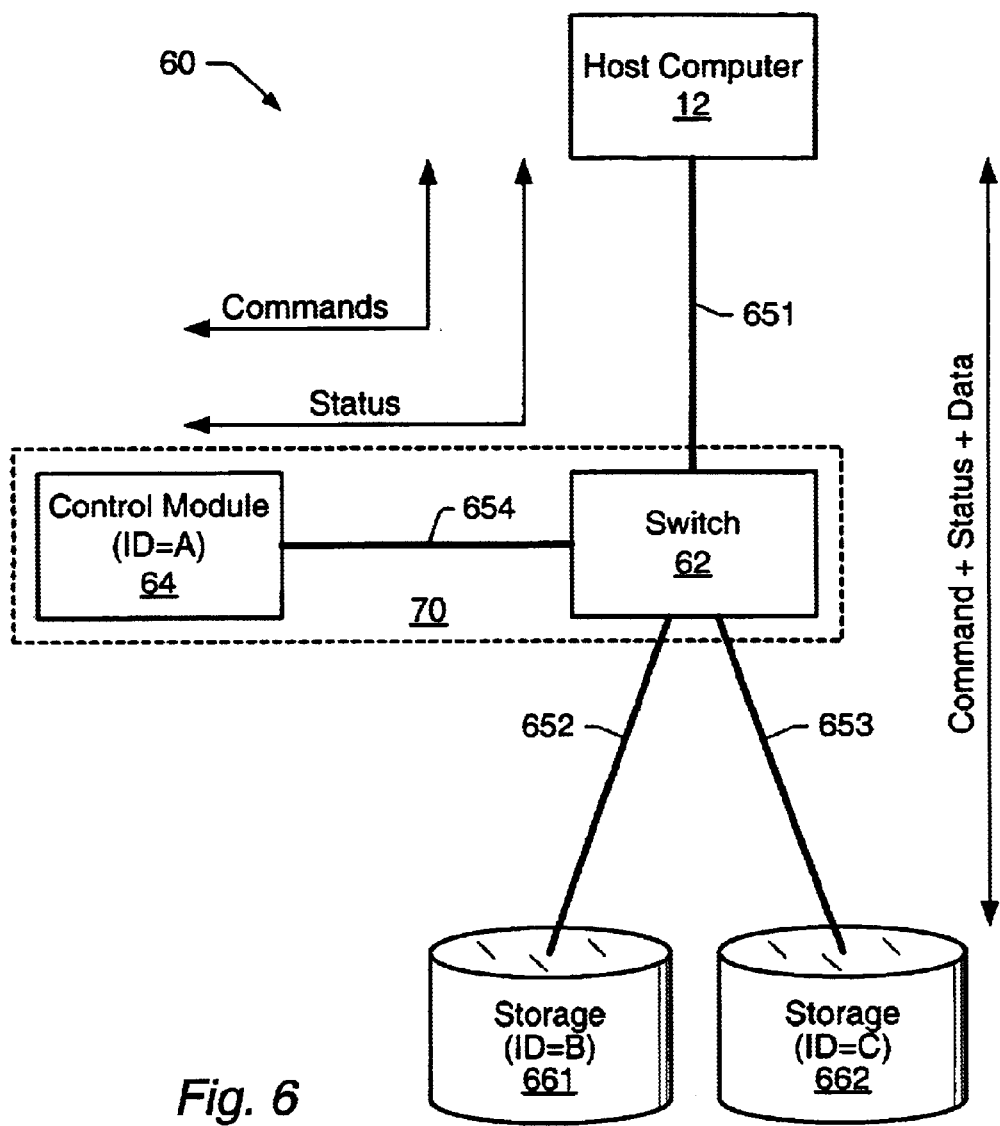
FIG. 6 shows an exemplary embodiment of a computer system wherein the storage controller employs a messaging scheme that facilitates data transfer to/from the host computer under a two-way point-to-point interconnect standard.

Referring now to FIG. 6, a computer system 60 implementing a modified messaging scheme to transfer data to/from the host computer 12 is shown. Although the computer system 60 is shown with two storage devices 661, 662 coupled to the switch 62, the discussion herein applies equally when there is only one storage device or, alternately, when there is more than two storage devices. Further, the storage controller 70 may include a modified control module 64 or a modified software driver to implement the illustrated messaging scheme. Additionally, the following discussion assumes that the interconnect links 651–654 are Fibre Channels. However, the messaging scheme disclosed herein may be implemented under any serial or parallel interface protocol.

In FIG. 6, the host computer 12 sends read or write commands to the control module 64 as usual. The control module 64 decodes the received command and translates it into one or more commands according to the data transfer request from the host and according to the RAID configuration, if applicable. However, instead of issuing these translated commands to the storage device 661 and/or 662 (in a way similar to that shown, for example, in FIGS. 3A–3E, 4A and 4B), the control module 64 sends those translated commands to the host 12. The host adapter card (not shown) may receive this list of commands from the control module 64 via the switch 62. The software driver for the host adapter card may then issue this new set of commands to the storage device 661 and/or 662.

Thus, the net effect of such messaging is that the data transfer commands (after translation by the control module 64) appear to have been issued directly from the host 12 to the storage device 661 and/or 662 via the switch 62. The storage device 661 and/or 662 thus responds by performing the transfer of data to/from the host 12 as indicated by the data transfer commands from the host. In case of a data write operation, for example, the data would be stored in the same location in one or more storage devices had the command been sent by the control module (for example, in a way similar to that shown in FIGS. 3A–3E, 4A and 4B) instead of the host computer sending the translated set of commands. The data transfer mechanism is therefore substantially simplified, especially in view of two-party interface protocols, such as the Fibre Channel protocol. Further, since the switch does not need to modify transfers to account for a third party, a standard controller switch (for example, switch 62) may be conveniently used.

The data transfer through a conventional storage controller was described with reference to FIGS. 1 and 2. The present data transfer mechanism in FIG. 6 accomplishes independent scalability of storage controller performance metrics (iops and data transfer bandwidth) without passing every command, status and data information through the conventional controller as in FIG. 1. There are two separate transactions illustrated in FIG. 6: (1) command and status information flowing between the host 12 and the control module 64 via the switch 62 and over the control path identified by the links 651 and 654; and (2) command, status and data flowing directly between the host 12 and the storage device 661 via the switch 62 and over the control and data paths embodied in the links 651 and 652 and/or 653. As previously mentioned, the control and data paths in the interconnect links 651, 652 and 653 may be physically separate or may be shared. However, a shared nature of control and data paths does not affect the independence in scalability of performance metrics because of separation of the storage controller's 70 control-related functions (i.e., transfer of command and status packets) from its data transfer bandwidth.

In one embodiment, the storage controller 70 further includes other modules, e.g., the parity logic or the cache memory (as shown, for example, in FIG. 4A). The control module 64 transmits appropriate routing information to the switch 62 along with the set of translated data transfer commands to be forwarded to the host 12. The host 12 eventually issues all data transfer commands, and based on the routing information the switch 62 may route the data to the cache memory or to the parity logic (for parity calculation) or directly to the appropriate storage device as indicated by the data transfer command coming from the host 12. The data is thus still transferred between the host 12 and one or more storage devices independently of the control functionality of the control module 64. Independence in performance scalability is thus maintained in case of data transfers under a two-party interface protocol, e.g., the Fibre Channel protocol.

Figure 7:
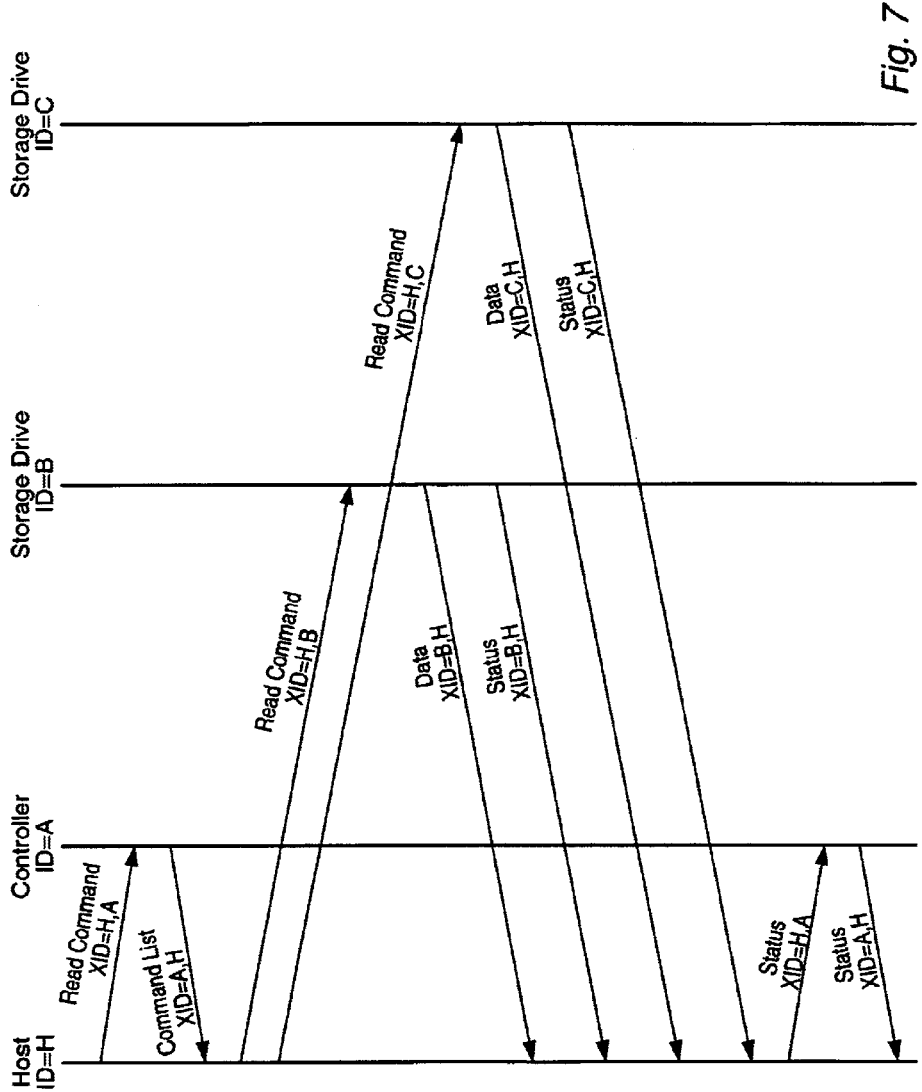
FIG. 7 is an exemplary flow diagram of control and data packets during a read operation initiated by the host computer of FIG. 6.

Referring now to FIG. 7, an exemplary flow of control information (i.e., command and status information) and data information during a read operation initiated by the host computer 12 in the system architecture of FIG. 6 is illustrated. The host 12 issues the read command to the control module 64 identifying the control module as its intended recipient (XID=H, A). The control module 64 decodes the received command as a data read command and translates the read command depending on the type of the read command (from the host) and depending on the nature of the data read. Relevant parity and/or cache storage information may also be transmitted to the host as part of the list of translated commands.

Here, the control module 64 determines that the read command from the host requires data from both of the storage devices, 661 and 662. Therefore, the control module 64 sends appropriate decoded data read commands to the host identifying the storage devices to be accessed for the required data. During the next step of the data read operation, the host software driver in conjunction with the host adapter card issues appropriate data read commands (received as part of the list of translated commands from the control module) directly to storage device 661 (XID=H, B) and also to the device 662 (XID=H, C). As the storage devices or storage drives, whatever the case may be, receive corresponding data read commands directly from the host, they transfer the requested data and status information directly to the host 12 via the switch 62. The host 12 receives the status information from both of the storage devices, 661 and 662, and forwards that information to the control module 64 (XMD=H, A), which, in response, sends a final status packet to the host indicating the control module 64 as the originator of the status packet (XID=A, H). The control module 64 may process the forwarded status information prior to responding with the final status packet. In one embodiment, the host 12 (through the host adapter card) may fully or partially process the status information received from the storage devices, 661 and 662, and may then transmit the processed status information to the control module 64, which, in turn, may respond with appropriate data transfer status recognition signal. A status packet from the control module 64 to the host 12 may function to indicate completion of the sequence of control and data transfer operations initiated by the data read command from the host 12 to the control module 64.

Figure 2:
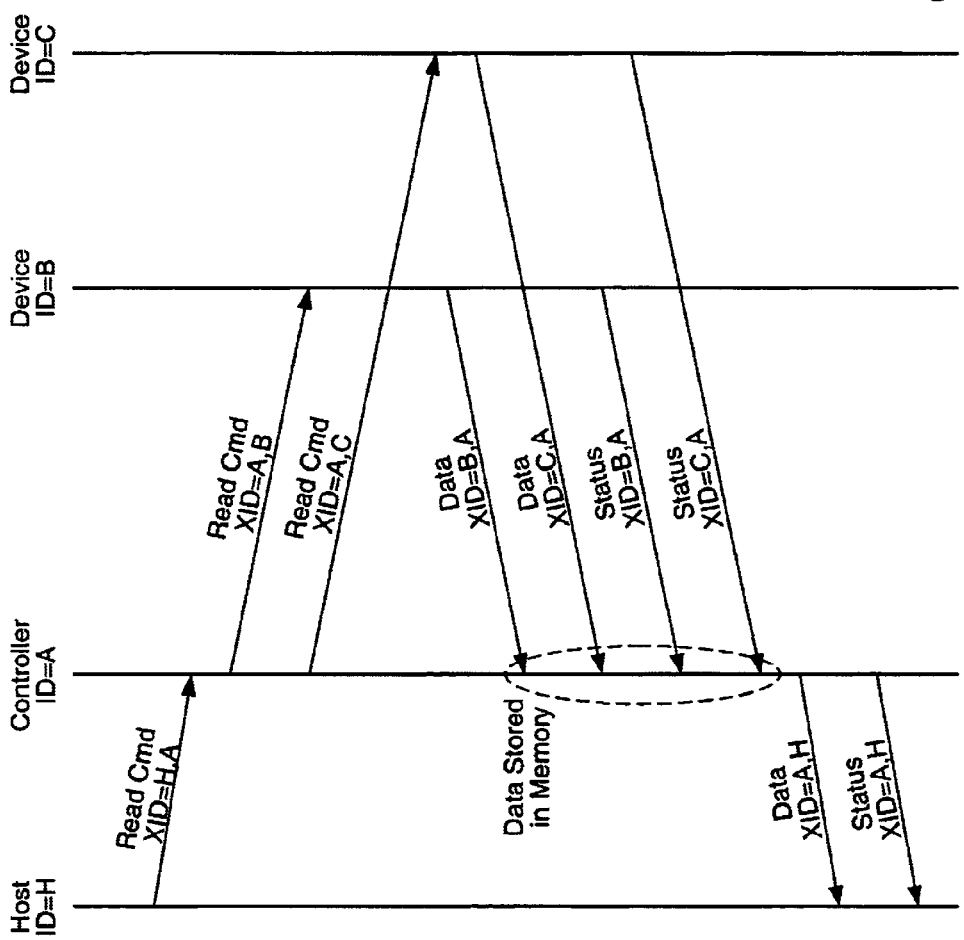
FIG. 2 is an exemplary flow diagram of control and data packets during a read operation initiated by the host computer of FIG. 1, wherein the host computer, storage controller, and storage devices communicate via a two-party data transfer protocol.

It is noted that the foregoing messaging sequence differs from that shown in FIG. 2 and also from the one describes with reference to FIGS. 3A–3E, 4A and 4B. However, the present messaging scheme (as shown by way of examples in FIGS. 6 and 7) accomplishes the same result as is achieved by the storage architectures in FIGS. 3A–3E, 4A and 4B—i.e., independent scalability of storage performance metrics—without any necessity to modify the standard storage controller switch (for example, the switch 62 in FIG. 6) depending on the interface protocol. This is especially useful, for example, in case of a two-party interface protocol (e.g., the Fibre Channel protocol) where it may be desirable to maintain the existing standard switch architecture and still have independent scalability of performance storage metrics (iops and data transfer bandwidth).

The above described embodiments achieve separation of the command and status paths (i.e., the control path) from the data path in different ways. For example, switch 22 of storage controller 26 in FIGS. 3A–E and 4A–B may be modified to route data addressed to storage controller 26 directly to host computer 12. The resultant bypassing of control module 24 within storage controller 26 allows independent scalability of storage system iops and data transfer rate. However, as switch 22 must be modified to route data addressed to storage controller 26 directly to host computer 12, switch 22 in FIGS. 3A–E and 4A–B may be a non-standard switch, and a two party protocol such as the Fibre Channel protocol may be violated.

In computer system 60 of FIGS. 6–7, host computer 12 reissues commands translated by storage controller 14. Switch 22 may perform standard switching functions and may thus be a standard switch, and a two party protocol such as Fibre Channel may not be violated. Although computer system 60 achieves separation of control and data paths, thus allowing independent scalability of storage system iops and data transfer rate, host adapter hardware and host driver software within host computer 12 may need to be modified to allow command reissue. Thus in computer system 60, the host adapter hardware and host driver software may be non-standard.

Figure 8:
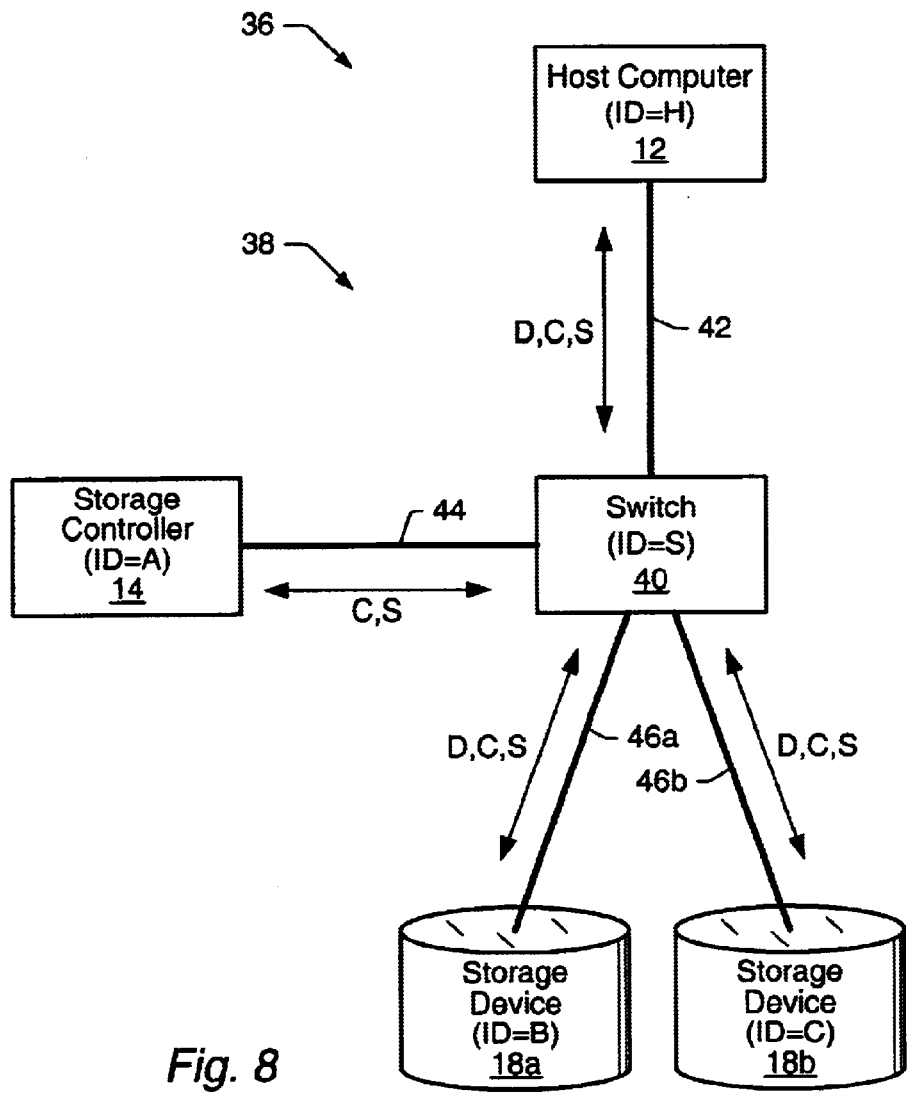
FIG. 8 is a block diagram of one embodiment of a computer system including a switch coupled between the host computer and two storage devices, and wherein the storage controller is coupled to the switch, and wherein the computer system achieves separation of control and data paths using a modified switch and standard host adapter hardware and host driver software, and wherein a two party protocol such as the Fibre Channel protocol is not violated.

FIGS. 8, 9, 10A–B, 11, and 12A–B will now be used to describe an embodiment of a computer system including a storage system which achieves separation of control and data paths, thus allowing independent scalability of storage system iops and data transfer rate, using a modified switch and standard host adapter hardware and host driver software, and wherein a two party protocol such as the Fibre Channel protocol is not violated. FIG. 8 is a block diagram of one embodiment of a computer system 36 including host computer 12 coupled to a storage system 38. Storage system 38 includes a switch 40, storage controller 14, and two storage devices 18a–b. Switch 40 is coupled to host computer 12 via an interconnect link 42, to storage controller 14 via an interconnect link 44, and to storage devices 18a–b by respective interconnect links 46a–b.

As indicated in FIG. 8, control information (including command "C" and status "S" signals) flow between all elements of computer system 36 long interconnecting links 42, 44, and 46a–b. On the other hand, data "D" signals flow only between host computer 12 and switch 40 along link 42, and between switch 40 and storage devices 18a–b along respective links 46a–b. Storage transfer data does not flow between switch 40 and storage controller 14 along link 44, thus data bypasses storage controller 14. The resultant separation of control and data paths allows independent scalability of the iops and data transfer rate of storage system 38 as described above.

In the embodiment of FIG. 8, switch 40 is an independent element of storage system 38 and has its own address. Packets are addressed to switch 40, allowing a two party protocol such as the Fibre Channel protocol to be adhered to. In addition, host computer 12 addresses data transfer commands (i.e., read and write commands) to switch 40 as it would to a storage controller in a conventional system. The operation of switch 40 is described in detail below.

Figure 9:
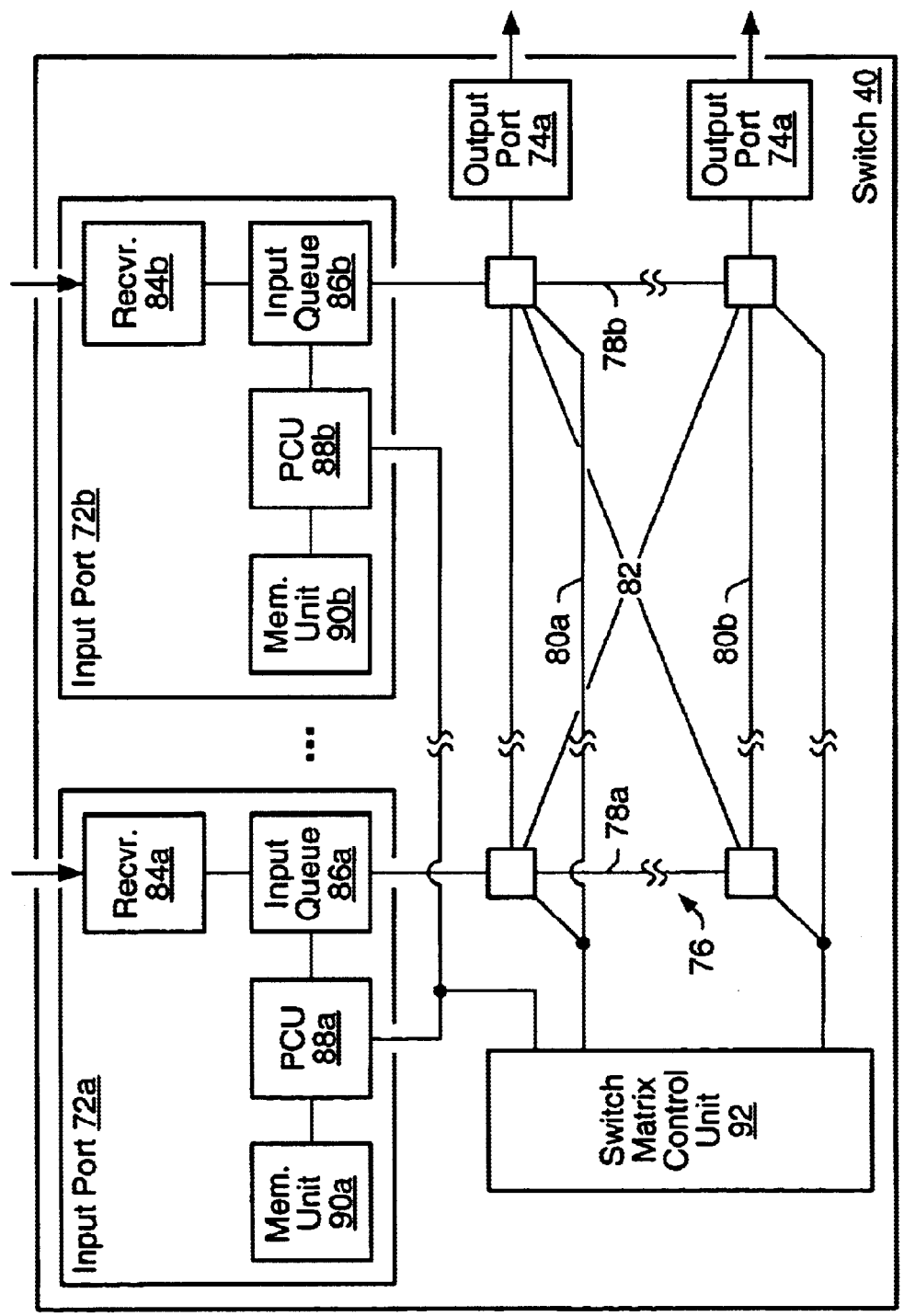
FIG. 9 is a block diagram of one embodiment of the switch of the computer system of FIG. 8, wherein the switch includes multiple input ports, and wherein each input port includes a receiver, and input queue, a port control unit, and a memory unit for storing frame header substitution information.

FIG. 9 is a block diagram of one embodiment of switch 40. In the embodiment of FIG. 9, switch 40 is a crossbar switch having multiple input ports 72a–b and multiple output ports 74a–b selectively coupled via electrical conductors and switching elements of a switch matrix 76. Switch matrix 76 includes multiple column buses 78a–b, multiple row buses 80a–b, and multiple switching elements 82. In one embodiment, each column bus 78 and row bus 80 includes one or more electrical conductors. Each switching element 82 is associated with a column bus 78 and a row bus 80, and when activated couples the one or more electrical conductors of the associated column bus 78 to corresponding electrical conductors of the associated row bus 80.

Input port 72a includes a receiver 84a coupled to an input queue 86a, a port control unit (PCU) 88a coupled to input queue 86a, and a memory unit 90a coupled to port control unit 88a. Input port 72b includes a receiver 84b coupled to an input queue 86b, a port control unit (PCU) 88b coupled to input queue 86b, and a memory unit 90b coupled to port control unit 88b. Each receiver 84 receives input data (e.g., from a transmission medium coupled to the receiver 84) and provides the input data to the input queue 86. The input queue 86 includes a memory buffer and is used to store the received input data. Each port control unit 88 is configured to control the respective input port 72. As will be described in more detail below, each memory unit 90 is used to store frame header substitution information.

Each switching element 82 is coupled to a switching matrix control unit 92, and each port control unit 88 is also coupled to switch matrix control unit 92. When a given input port 72 is ready, to drive a frame of data upon the corresponding column bus 78, the port control unit 88 provides the destination address of the frame to switch matrix control unit 92. A device having an address equal to the destination address may be coupled to one of the output ports 74 via a transmission medium, and switch matrix control unit 92 may associate the output port 74 coupled to the device with the device address (i.e., the destination address). Switch matrix control unit 92 activates one of the switching elements 82 residing along the column bus 78 dependent upon the destination address such that the column bus 78 is coupled to the row bus 80 corresponding to the output port 74 associated with the destination address. The frame of data is thus provided to the output port 74 associated with the destination address. The output port 74 drives the frame of data upon the transmission medium, thus routing the data to the device.

In FIG. 9, input ports 72 and output ports 74 of switch 40 are shown separated in order to simplify the drawing. It is noted that a given input port 72 may be paired with an output port 74 to form a bidirectional input/output (I/O) port. Input ports 72 and output ports 74 may be positioned next to one another, and may share the same physical I/O connection to a transmission medium.

Figure 10A:
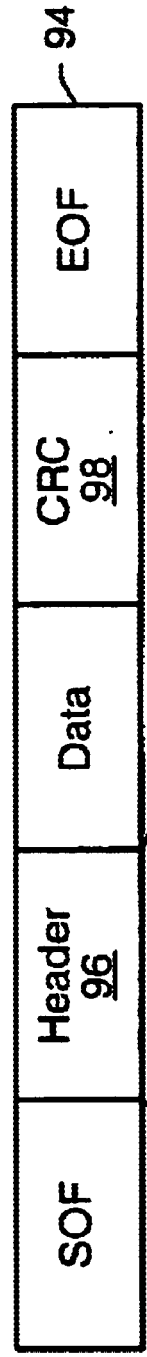
FIG. 10A is a diagram of an exemplary data frame according to a data transfer standard such as the Fibre Channel standard, wherein the data frame includes a header field.

FIG. 10A is a diagram of an exemplary data frame 94 according to a data transfer standard (e.g., the Fibre Channel standard). Frame 94 includes a start of frame (SOF) field, a header field 96, a data field, a cyclic redundancy check (CRC) field 98, and an end of frame (EOF) field. CRC field 98 includes a mathematical value used for error detection derived using the information contained within the SOF field, header field 96, and the data field.

Figure 10B:
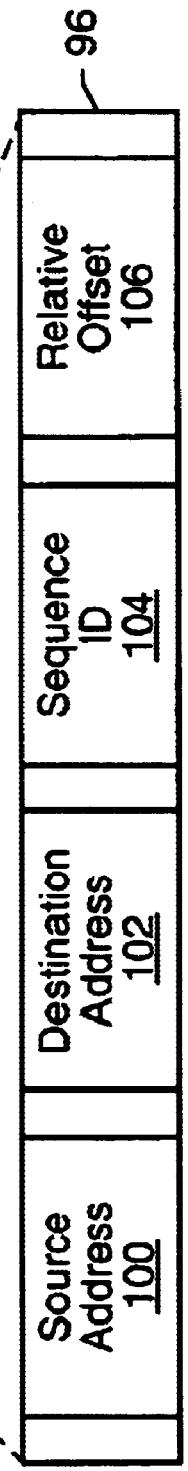
FIG. 10B is a diagram of an exemplary header field of the data frame of FIG. 10A.

FIG. 10B is a diagram of an exemplary header field 96 of frame 94 of FIG. 10A. Header field 96 includes a source address field 100, a destination address field 102, a sequence identification (ID) field 104, and a relative offset field 106. Source address field 100 contains the address of the device which generated frame 94 (i.e., the source device), wherein the address of the source device is a value which uniquely identifies the source device. Destination address field 102 contains the address of the device which is the intended receiver of frame 94 (i.e., the destination device), wherein the address of the destination device is a value which uniquely identifies the destination device. In the Fibre Channel standard, a "sequence" is composed of one or more frames containing "payload" specific to a particular protocol (e.g., the small computer system interface or SCSI protocol).

Sequence ID field 104 identifies each sequence between an exchange originator and responder with a unique value. Relative offset field 106 contains a value indicating an offset associated with the data contained within the data field of frame 94 relative to a base address of a data buffer associated with a data transfer operation.

As will be described in more detail below, the port control unit 88 of each input port 72 of switch 40 may modify the contents of various fields of frame 94, including header field 96 and CRC field 98, such that data transfers between host computer 12 and storage devices 18a–b bypass storage controller 14 (FIG. 8), allowing independent scalability of the iops and data transfer rate of storage system 38 as described above. Fields of header field 94 which may be modified by the port control unit 88 of each input port 72 of switch 40 include, and are not limited to, source address field 100, destination address field 102, sequence ID field 104, and relative offset field 106.

Figure 11:
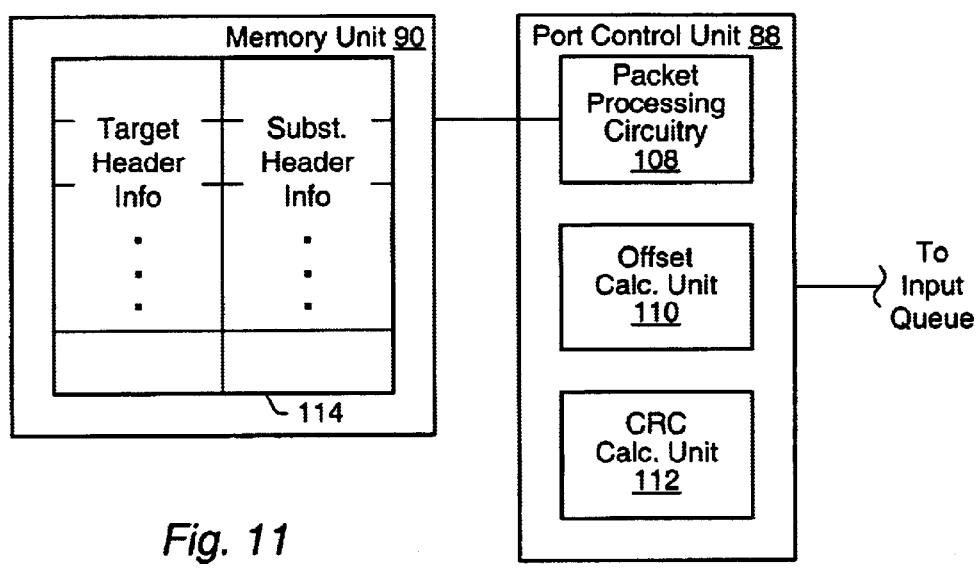
FIG. 11 is a block diagram of one embodiment of one of the port control units of FIG. 9 coupled to the respective memory unit, wherein the port control unit includes packet processing circuitry, an offset calculation unit, and a CRC calculation unit.

FIG. 11 is a block diagram of one embodiment of port control unit 88 of FIG. 9 coupled to the respective memory unit 90. Port control unit 88 includes packet processing circuitry 108, an offset calculation unit 110, and a CRC calculation unit 112. Packet processing circuitry 108 is coupled to memory unit 90 used to store a lookup table 114. Lookup table 114 is a table of target header information and corresponding substitute header information. Upon receiving a data transfer command from host computer 12, storage controller 14 generates one or more translated data transfer commands and frame header substitution information associated with the data transfer. The frame header substitution information includes target header information and corresponding substitute header information. Storage controller 14 provides the one or more translated data transfer commands and the frame header substitution information to switch 40. Switch 40 stores the frame header substitution information within memory units 90 of input ports 72 involved in the data transfer. When header information of a data frame received by an input port 72 matches target header information stored within memory unit 90, packet processing circuitry 108 replaces the header information with the substitute header information corresponding to the target header information. As a result, data is transferred between host computer 12 and storage devices 18a–b through switch 40 such that the storage transfer data does not flow through storage controller 14.

Offset calculation unit 110 generates values for relative offset fields 106 of data frames received by the corresponding input port 72. When storage controller 14 of FIG. 8 receives a data transfer command, storage controller 14 determines if the data is stored within storage device 18a, 18b, or both storage devices 18a and 18b. If the data is stored within both storage devices 18a and 18b, storage controller 14 provides information to switch 40 indicating how the data is divided up amongst storage devices 18a–b. Offset calculation unit 110 uses this information to calculate the values for relative offset fields 106 of the data frames. CRC calculation unit 112 calculates CRC values for frames modified by the corresponding input port 72.

Figure 12A:
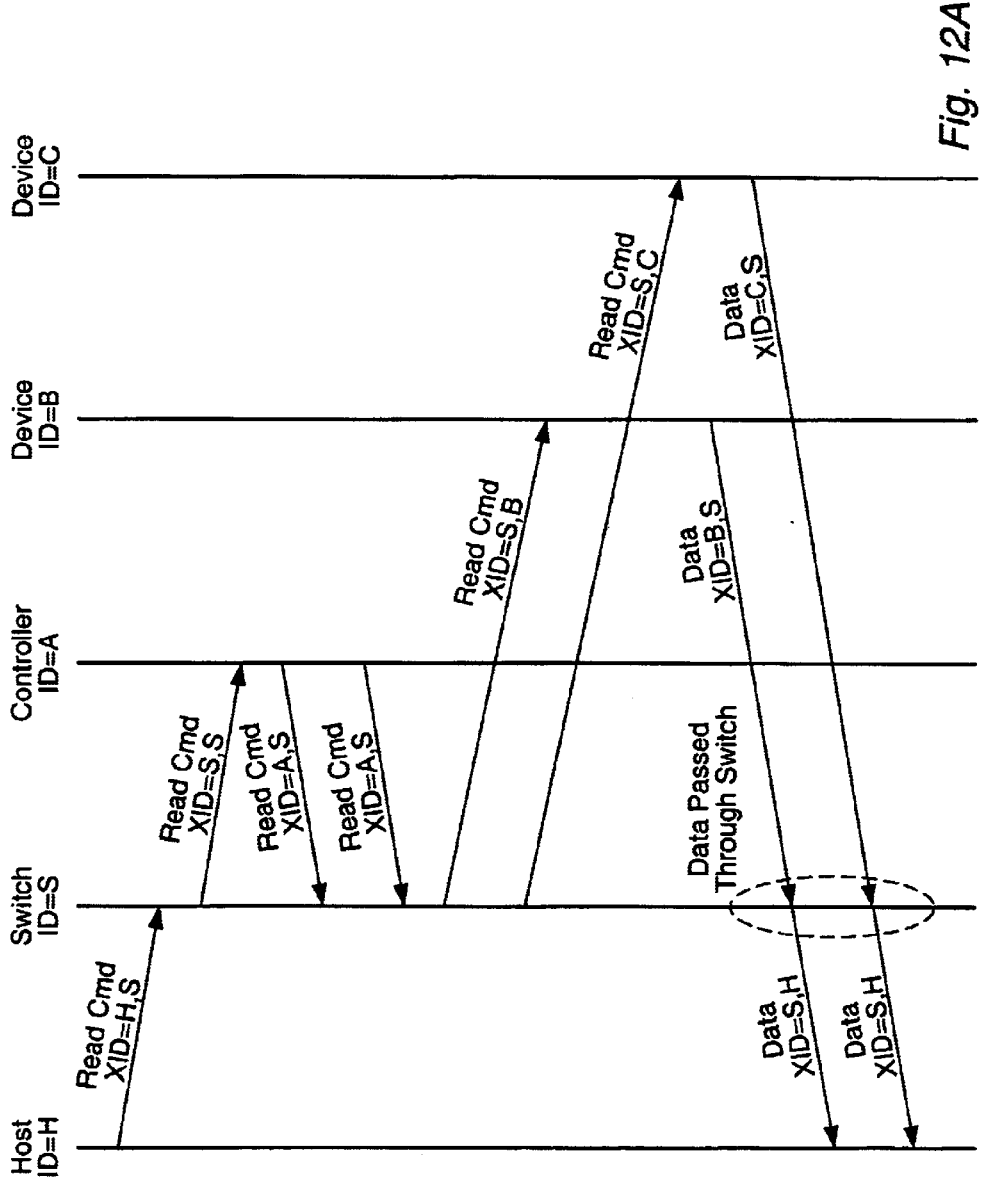
FIGS. 12A and 12B illustrate an exemplary flow of control and data packets during a data read operation initiated by the host computer of the computer system of FIG. 8.
Figure 12B:
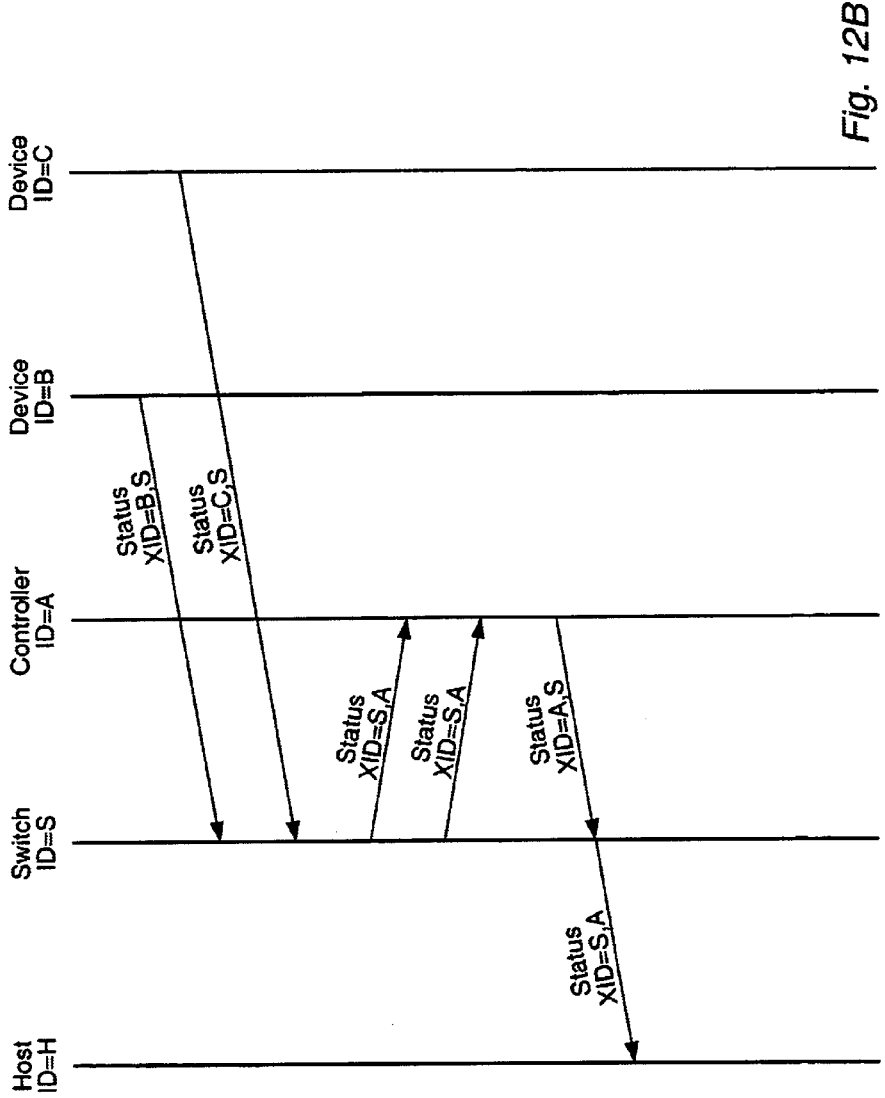

FIGS. 12A–B and Table 1 below will now be used to describe an exemplary flow of packets during a data read operation initiated by host computer 12 of computer system 36 of FIG. 8.

TABLE 1

Packet Header Field Values For Exemplary Read Operation.

| Ref. Num. | Source Address Field (S_ID) | Destination Address Field (D_ID) | Sequence Identifier Field (SEQ_ID) | Relative Offset Field (RLTV_OFF) |
|---|---|---|---|---|
| 1 | H | S | 1 | 0 |
| 2 | S | A | 1 | 0 |
| 3 | A | S | 1 | 0 |
| 4 | A | S | 2 | 0 |
| 5 | S | B | 2 | 0 |
| 6 | S | C | 3 | 0 |
| 7 | B | S | 1 | 0 |
| 8 | S | H | 4 | 0 |
| 9 | C | S | 1 | 0 |
| 10 | S | H | 5 | α |
| 11 | B | S | 2 | 0 |
| 12 | C | S | 2 | 0 |
| 13 | S | A | 6 | 0 |
| 14 | S | A | 7 | 0 |
| 15 | A | S | 3 | 0 |
| 16 | S | H | 8 | 0 |

FIGS. 12A–B illustrate an exemplary flow of packets during a data read operation initiated by host computer 12 of computer system 36 of FIG. 8. Although packets may include multiple frames, packets containing only single frames will be assumed hereinbelow for simplicity. Referring to FIGS. 8, 10a–b, and 12a–b in combination with Table 1 above, host computer 12 transmits a read command packet identifying switch 40 as its destination (XID=H, S) via link 42. Sequence ID field 104 of header field 96 of the frame of the read command packet contains the value 1.

A first input port 72 of switch 40 coupled to host computer 12 via link 42 receives the frame of the read command packet. The first input port 72 may use secondary address information within the frame, the contents of source address field 100 of header field 96 (S_ID=H), and/or information within the frame identifying the frame as containing a data transfer command in order to determine that the read command packet should be routed to storage controller 14. Packet processing circuitry 108 of the port control unit of the first input port 72 preferably encapsulates the received read command packet within an encapsulating packet. The frame of the encapsulating packet preferably has a header field 96 including source address field 100 containing the address of switch 40 (ID=S) and destination address field 102 containing the address of storage controller 14 (ID=A). Switch 40 selects a value of 1 for sequence ID field 104 of header field 96 of the frame of the encapsulating packet.

Alternately, packet processing circuitry 108 of the port control unit of the first input port 72 may modify header field 96 of the received read command packet, substituting the address of switch 40 (ID=S) for the source address within source address field 100 and the address of storage controller 14 (ID=A) for the destination address within destination address field 102. CRC calculation unit 112 of the port control unit may calculate the CRC value for the modified frame and store the resultant value in CRC field 98 of the frame. Based upon the destination address within destination address field 102 of header field 96, switch 40 may transmit the read command packet to storage controller 14 (XID=S, A) via link 44. Switch 40 may select a value of 1 for sequence ID field 104 of header field 96 of the frame of the read command packet.

Storage controller 14 receives the packet including the read command via link 44 and determines that two separate read operations are required to obtain the data requested by host computer 12; one from storage device 18a and the other from storage device 18b. Storage controller 14 translates the read command generated by host computer 12 into two separate read commands; a first translated read command for storage device 18a and a second translated read command for storage device 18b. Each of the translated read commands instructs respective storage devices 18a–b to access and provide data identified by the translated read command. Storage controller 14 may also generate routing information for the translated read commands. The routing information may be used by switch 40 to direct the translated read commands to the appropriate storage devices.

Storage controller 14 also generates frame header substitution information described above (i.e., target header information and corresponding substitute header information) for the lookup tables of input ports 72 of switch 40 involved in the data transfer. The target header information includes at least a portion of header field 96 of a frame of a data packet expected to be transmitted by a storage device and received by switch 40 in response to a translated data transfer command. The substitute header information includes header information to be substituted by switch 40 for the header information of a frame if the header information matches the target header information. Such header information substitution results in switch 40 routing data directly between host computer 12 and storage devices 18a–b such that the data does not pass through storage controller 14. The frame header substitution information may additionally include information indicating how the requested data is divided up amongst storage devices 18a–b.

Storage controller 14 packetizes the first translated read command to form a first translated read command packet. In a preferred embodiment, the first translated read command packet includes header field information directing the first translated read command packet to storage device 18a. Storage controller 14 preferably encapsulates the first translated read command packet and the associated frame header substitution information within a first encapsulating packet, and transmits the first encapsulating packet to switch 40 (XID=A, S) via link 44 with a value of 1 for sequence ID field 104 of header field 96 of the frame of the first encapsulating packet.

Alternately, the first translated read command packet may include: (i) routing information for redirecting the first translated read command packet to storage device 18a, and (ii) the frame header substitution information associated with the first translated read command packet, within the first translated read command packet. Storage controller 14 may transmit the first translated read command packet to switch 40 (XID=A, S) via link 44 with a value of 1 for sequence ID field 104 of header field 96 of the frame of the first translated read command packet.

Storage controller 14 packetizes the second translated read command to form a second translated read command packet. In a preferred embodiment, the second translated read command packet includes header field information directing the second translated read command packet to storage device 18b. Storage controller 14 preferably encapsulates the second translated read command packet and the associated frame header substitution information within a second encapsulating packet, and transmits the second encapsulating packet to switch 40 (XID=A, S) via link 44 with a value of 2 for sequence ID field 104 of header field 96 of the frame of the second encapsulating packet.

Alternately, the second translated read command packet may include: (i) routing information for redirecting the second translated read command packet to storage device 18b, and (ii) the associated frame header substitution information, within the second translated read command packet. Storage controller 14 may transmit the second translated read command packet to switch 40 (XID=A, S) via link 44 with a value of 2 for sequence ID field 104 of header field 96 of the frame of the second translated read command packet. In other embodiments, storage controller 14 may transmit the routing information and/or the frame header substitution information to switch 40 via separate packets.

A second input port 72 of switch 40 coupled to storage controller 14 via link 44 receives the packets including the first and second translated read commands. In a preferred embodiment, second input port 72 receives the first and second encapsulating packets and extracts the first and second translated read command packets and the associated frame header substitution information from the first and second encapsulating packets. Alternately, second input port 72 may receive the first and second translated read command packets including routing information and associated frame header substitution information, and may extract the routing information and the associated frame header substitution information from the first and second translated read command packets. In other embodiments, second port 72 may receive separate packets including the routing information and/or the frame header substitution information as described above, and may extract the routing information and/or the frame header substitution information from the separate packets.

Switch 40 may store the frame header substitution information associated with the first translated read command packet within the lookup table of a third input port 72 of switch 40 coupled to storage device 18a via link 46a. The frame header substitution information may include target header information and corresponding substitute header information. The target header information may include some or all of the header information of the reference number 7 line in Table 1 (S_ID=B, D_ID=S, SEQ_ID=1, and RLTV_OFF=0). The substitute header information corresponding to the target header information may be some or all of the header information of the reference number 8 line in Table 1 (S_ID=S, D_ID=H, SEQ_ID=4, and RLTV_OFF=0).

Similarly, switch 40 may store the frame header substitution information associated with the second translated read command packet within the lookup table of a fourth input port 72 of switch 40 coupled to storage device 18b via link 46b. The target header information of the frame header substitution information may include some or all of the header information of the reference number 9 line in Table 1 (S_ID=C, D_ID=S, SEQ_ID=1, and RLTV_OFF=0), and the substitute header information corresponding to the target header information may be some or all of the header information of the line with reference number 10 in Table 1 (S_ID=S, D_ID=H, SEQ_ID=5, and RLTV_OFF=α).

The relative offset of "α" of the substitute header information for the fourth input port 72 is determined dependent upon how the requested data is divided up amongst storage devices 18a–b, and may be computed by storage controller 14 as substitute header information and stored within memory unit 90 of the fourth input port 72. Alternately, the relative offset of "α" may be computed by offset calculation unit 110 of the fourth input port 72 using the information provided by storage controller 14 indicating how the requested data is divided up amongst storage devices 18a–b. In other embodiments, the relative offset of "α" may be determined by storage controller 14 in conjunction with offset calculation unit 110. It is noted that when a data packet includes multiple frames, the relative offsets of the frames may differ from one another.

The port control unit of the second input port 72 may provide the frame header substitution information associated with the first translated read command packet to the port control unit of the third input port 72, and provide the frame header substitution information associated with the second translated read command packet to the port control unit of the fourth input port 72. Upon receiving the frame header substitution information and/or the routing information, the port control units of the third and fourth input ports 72 store the frame header substitution information within respective memory units 90.

When switch 40 receives routing information, packet processing circuitry 108 of the second input port 72 may modify the contents of header fields 96 of the frames of the first and second translated read command packets according to the associated routing information. For example, packet processing circuitry 108 of the second input port 72 may substitute the address of storage device 18*a* (ID=B) for the destination address within destination address field 102 of header field 96 of the frame of the first translated read command packet, and may substitute the address of storage device 18*b* (ID=C) for the destination address within destination address field 102 of header field 96 of the frame of the second translated read command packet. Packet processing circuitry 108 of the second input port 72 may also substitute the address of switch 40 (ID=S) for the source address within source address field 100 of header field 96 of the frame of the first and second translated read command packets. CRC calculation unit 112 of the port control unit of the second input port 72 may calculate the CRC value for each modified frame of the first and second translated read command packets.

Switch 40 transmits the first translated read command packet to storage device 18*a* (XID=S, B) via link 46*a*, selecting a value of 2 for sequence ID field 104 of header field 96 of the frame of the first translated read command packet. Switch 40 transmits the second translated read command packet to storage device 18*b* (XID=S, C) via link 46*b*, selecting a value of 3 for sequence ID field 104 of header field 96 of the frame of the second translated read command packet.

Storage device 18*a* receives the first translated read command packet, accesses the requested data, and transmits a first data packet including the requested data to switch 40 (XID=B, S) via link 46*a*, selecting a value of 1 for sequence ID field 104 of header field 96 of the frame of the first data packet. Similarly, storage device 18*b* receives the second translated read command packet, accesses the requested data, and transmits a second data packet including the requested data to switch 40 (XID=C, S) via link 46*b*, selecting a value of 1 for sequence ID field 104 of header field 96 of the frame of the second data packet. Storage devices 18*a–b* also generate status packets relaying the status of the read operations. The flow of data packets will be described first, followed by a description of the flow of status packets.

The receiver of the third input port 72 of switch 40 receives the frame of the first data packet from storage device 18*a* via link 46*a* and provides the frame to the input queue. The input queue temporarily stores the frame of the first data packet. Packet processing circuitry 108 of the port control unit searches the target header information portion of the lookup table within the memory unit 90 using the header information of the frame of the first data packet, finding a match (S_ID=B, D_ID=S. SEQ_ID=1, and RLTV_OFF=0). In response, packet processing circuitry 108 replaces the header information of the frame of the first data packet with the substitute header information from the lookup table and corresponding to the target header information (S_ID=S, D_ID=H, SEQ_ID=4, and RLTV_OFF=0). CRC calculation unit 112 of the port control unit calculates the CRC value for the modified frame and substitutes the calculated CRC value for the contents of CRC field 98 of the frame. Based upon the destination address of host computer 12 (ID=H) within destination address field 102 of the frame of the first data packet, switch 40 transmits the frame of the first data packet to host computer 12 (XID=S, H) via link 42. Host computer 12 receives the frame of the first data packet, extracts the data from the frame, and stores the data contained within the frame in a data buffer using the relative offset value of 0 found in relative offset field 106 of header field 96 of the frame.

The receiver of the fourth input port 72 of switch 40 receives the frame of the second data packet from storage device 18*b* via link 46*b* and provides the frame to the input queue. The input queue temporarily stores the frame of the second data packet. Packet processing circuitry 108 of the port control unit searches the target header information portion of the lookup table within the memory unit 90 using the header information of the frame of the second data packet, finding a match (S_ID=C, D_ID=S, SEQ_ID=1, and RLTV_OFF=0). In response, packet processing circuitry 108 replaces the header information of the frame of the second data packet with the substitute header information from the lookup table and corresponding to the target header information (S_ID=S, D_ID=H, SEQ_ID=5, and RLTV_OFF=$\alpha$). CRC calculation unit 112 of the port control unit calculates the CRC value for the modified frame and substitutes the calculated CRC value for the contents of CRC field 98 of the frame. Based upon the destination address of host computer 12 (ID=H) within destination address field 102 of the frame of the second data packet, switch 40 transmits the frame of the second data packet to host computer 12 (XID=S, H) via link 42. Host computer 12 receives the frame of the second data packet, extracts the data from the frame, and stores the data contained within the frame in a data buffer using the relative offset value of "$\alpha$" found in relative offset field 106 of header field 96 of the frame.

It is noted that switch 40 automatically forwards the first and second data packets to host computer 12. As a result, the data packets produced by storage devices 18*a–b* do not pass through storage controller 14. Write operations may also be handled such that data packets originating with host computer 12 and bound for storage devices 18*a–b* pass only through switch 40 and do not pass through storage controller 14. Computer system 36 including storage system 38 achieves separation of control and data paths, thus allowing independent scalability of storage system iops and data transfer rate, using a modified switch 40, standard host adapter hardware and host driver software. In addition, a two party protocol such as the Fibre Channel protocol is not violated.

Following generation and transmission of the first and second data packets, storage devices 18*a–b* generate respective first and second status packets relaying the status of the read operations. FIG. 12B illustrates an exemplary flow of status packets during the read operation. Storage device 18*a* transmits the first status packet to switch 40 (XID=B, S) via link 46*a*, selecting a value of 2 for sequence ID field 104 of header field 96 of the frame of the first status packet. Similarly, storage device 18*b* transmits the second status packet to switch 40 (XID=C, S) via link 46b, selecting a value of 2 for sequence ID field 104 of header field 96 of the frame of the first status packet.

The third input port 72 of switch 40 receives the frame of the first status packet from storage device 18a via link 46a. The third input port 72 may use information within the frame identifying the frame as a status frame in order to determine that the status frame should be routed to storage controller 14. Packet processing circuitry 108 of the port control unit substitutes the address of switch 40 (ID=S) for the source address within source address field 100 of header field 96 and the address of storage controller 14 (ID=A) for the destination address within destination address field 102 of header field 96. CRC calculation unit 112 of the port control unit calculates the CRC value for the modified status frame. Based upon the destination address of storage controller 14 (ID=A) within destination address field 102 of header field 96 of the status frame, switch 40 transmits the first status packet to storage controller 14 (XID=S, A) via link 44, selecting a value of 6 for sequence ID field 104 of header field 96 of the frame of the first status packet. Storage controller 14 receives the frame of the first status packet, extracts the status information, and temporarily stores the status information within an internal memory.

The fourth input port 72 of switch 40 receives the frame of the second status packet from storage device 18b via link 46b. The fourth input port 72 may use information within the frame identifying the frame as a status frame and/or frame header substitution information stored within memory unit 90 in order to determine that the status frame should be routed to storage controller 14. Packet processing circuitry 108 of the port control unit substitutes the address of switch 40 (ID=S) for the source address within source address field 100 of header field 96 and the address of storage controller 14 (ID=A) for the destination address within destination address field 102 of header field 96 of each status frame. CRC calculation unit 112 of the port control unit calculates the CRC value for each modified status frame. Based upon the destination address of storage controller 14 (ID=A) within destination address field 102 of header field 96 of the status frame, switch 40 transmits the second status packet to storage controller 14 (XID=S, A) via link 44, selecting a value of 7 for sequence ID field 104 of header field 96 of the frame of the second status packet.

Storage controller 14 receives the frame of the second status packet, extracts the status information, and combines the extracted status information with the status information from storage device 18a to form composite status information. Storage controller 14 packetizes the composite status information to form a composite status packet. In a preferred embodiment, the composite status packet includes header field information directing the composite status packet to host computer 12. Storage controller 14 preferably encapsulates the composite status packet within an encapsulating packet.

The encapsulating packet may also include instructions to remove frame header substitution information associated with the read operation from the lookup tables of the third and fourth input ports 72 of switch 40. For example, the instructions include within the encapsulating packet may include instructions to remove the lookup table entry including target header information (S_ID=B, D_ID=S, SEQ_ID=1, and RLTV_OFF =0) and substitute header information (S_ID=S D_ID=H SEQ_ID=4, and RLTV_OFF=0), associated with the read operation, from the lookup table of the third input port 72. Similarly, the instructions may include instructions to remove the lookup table entry including target header information (S_ID=C, D_ID=S SEQ_ID=1, and RLTV_OFF=0) and substitute header information (S_ID=S, D_ID=H, SEQ_ID=5, and RLTV_OFF= $\alpha$), associated with the read operation, from the lookup table of the fourth input port 72. Storage controller 14 transmits the encapsulating packet to switch 40 (XID=A, S) via link 44, selecting a value of 3 for sequence ID field 104 of header field 96 of the frame of the encapsulating packet.

Alternately, the composite status packet may include: (i) routing information for redirecting the composite status packet to host computer 12, and (ii) the instructions to remove frame header substitution information associated with the read operation from the lookup tables of the third and fourth input ports 72 of switch 40 described above. Storage controller 14 may transmit the composite status packet to switch 40 (XID=A, S) via link 44, selecting a value of 3 for sequence ID field 104 of header field 96 of the frame of the composite status packet.

The second input port 72 of switch 40 coupled to storage controller 14 via link 44 receives the packet including the composite status information. In a preferred embodiment, second input port 72 receives the encapsulating packet and extracts the composite status packet and the instructions associated with the read operation from the encapsulating packet. Alternately, second input port 72 may receive the composite status packet including routing information and the instructions associated with the read operation, and may extract the routing information and the instructions associated with the read operation from the composite status packet.

The port control unit of the second input port 72 may provide the instructions to remove frame header substitution information associated with the read operation to the port control units of the third and fourth input ports 72. Upon receiving the instructions, the port control units of the third and fourth input ports 72 may remove frame header substitution information associated with the read operation from the respective lookup tables.

When the composite status packet is directed to switch 40 and includes routing information, packet processing circuitry 108 of the second input port 72 may modify the contents of header field 96 of the frame of the composite status packet according to the routing information. For example, packet processing circuitry 108 may substitute the address of host computer 12 (ID=H) for the destination address within destination address field 102 of header field 96 of the frame of the consolidated status packet, and may substitute the address of switch 40 (ID=S) for the source address within source address field 100 of header field 96. CRC calculation unit 112 of the port control unit of the second input port 72 may calculate the CRC value for the modified frame of the consolidated status packet.

Based upon the destination address within destination address field 102 of header field 96 of the frame of the consolidated status packet, switch 40 transmits the frame of the consolidated status packet to host computer 12 (XID=S, H) via link 42, selecting a value of 8 for sequence ID field 104 of header field 96 of the frame of the composite status packet. Host computer 12 receives the consolidated status packet, and extracts and processes the consolidated status information.

It is noted that the embodiment of switch 40 illustrated in FIG. 9 and described above is but one of many possible embodiments. Switch 40 of FIG. 9 is a crossbar switch with distributed memory. That is, each input port 72 has its own input buffer (input queue 86) and its own memory unit 90 for storing frame header substitution information. Other embodiments of switch 40 may have a centralized memory divided into portions such that each input port is allocated a different portion of the centralized memory for storing input data. A portion of such a centralized memory may also be allocated for storing frame header substitution information. Alternately, a single separate memory may be provided for storing frame header substitution information.

It is also noted that parity calculator 32 and/or cache 34 (FIGS. 4A–B) may also be incorporated within switch 40 (FIGS. 8–9), and the frame header substitution routing technique described above with respect to switch 40 (FIGS. 8–9) may also be used within switch 22 (FIGS. 4A–B).

Numerous variations and modifications will become apparent to those skilled in the art once the above disclosure is fully appreciated. It is intended that the following claims be interpreted to embrace all such variations and modifications.

What is claimed is:

1. A data switch, comprising;
   a memory unit for storing frame header substitution information, wherein the frame header substitution information comprises a substitute destination address;
   a plurality of ports, wherein each of the plurality of ports is adapted for coupling to a transmission medium;
   an array of switching elements for selectively coupling the plurality of ports to one another;
   a switch matrix control unit coupled to receive routing information from the plurality of ports and configured to control the array of switching elements dependent upon the routing information;
   wherein the data switch is configured to receive frame header substitution information on one of the plurality of ports and to store the frame header substitution information within the memory unit; and
   wherein the data switch is further configured to: (i) receive a data frame on a port other than the port on which the frame header substitution information was received, wherein the data frame comprises header information including a destination address, (ii) replace the header information of the data frame with the substitute header information stored within the memory unit such that the substitute destination address becomes a new destination address, and (iii) provide the new destination address to the switch matrix control unit as the routing information.

2. The data switch as recited in claim 1, wherein the memory unit is distributed among the plurality of ports such that a given port comprises a portion of the memory unit for storing frame header substitution information associated with the port.

3. The data switch as recited in claim 1, wherein the frame header substitution information includes target header information and corresponding substitute header information.

4. The data switch as recited in claim 3, wherein each of the plurality of ports further comprises a port control unit configured to control the port and an input queue for storing received information, wherein the port control unit is coupled to the memory unit and to the input queue, and wherein when the data frame is received: (i) the data frame is stored within the input queue, (ii) the port control unit compares the header information of the data frame to the target header information stored within the memory unit, and (iii) the port control unit replaces the header information of the data frame with the substitute header information corresponding to the target header information if the header information of the data frame matches the target header information.

5. The data switch as recited in claim 4, wherein after the port control unit replaces the header information of the data frame with the substitute header information, the port control unit calculates a cyclic redundancy check (CRC) value for the data frame and inserts the CRC value into the data frame.

6. A method for routing a data frame, comprising:
   in response to a data request, forming an entry in a table of target header information and corresponding substitute header information, wherein the substitute header information comprises a substitute destination address;
   comparing header information of the data frame to the target header information, wherein the data frame is responsive to the data request;
   replacing the header information of the data frame with the substitute header information corresponding to the target header information if the header information of the data frame matches the target header information; and
   routing the data frame according to the substitute destination address of the substitute header information.

* * * * *